US009471819B2

(12) United States Patent
Tucker et al.

(10) Patent No.: US 9,471,819 B2
(45) Date of Patent: Oct. 18, 2016

(54) SYSTEM AND METHOD FOR QUALITY CONTROL, INSPECTION AND AUDIT OF UTILITY ASSETS

(71) Applicant: UTILYSTAR, LLP, Grand Junction, CO (US)

(72) Inventors: Layne D. Tucker, Grand Junction, CO (US); Gordon R. Hockridge, Chilliwack (CA); Tom Y. Sawyer, Jr., Grand Junction, CO (US); Tom D. Petty, Grand Junction, CO (US)

(73) Assignee: ECHORFID LLC., Grand Junction, CO (US)

(*) Notice: Subject to any disclaimer, the term of this patent is extended or adjusted under 35 U.S.C. 154(b) by 240 days.

(21) Appl. No.: 13/903,266

(22) Filed: May 28, 2013

(65) Prior Publication Data

US 2013/0321131 A1 Dec. 5, 2013

Related U.S. Application Data

(60) Provisional application No. 61/652,781, filed on May 29, 2012.

(51) Int. Cl.
*H04Q 5/22* (2006.01)
*G06K 7/10* (2006.01)
*F17D 5/00* (2006.01)

(52) U.S. Cl.
CPC .............. *G06K 7/10366* (2013.01); *F17D 5/00* (2013.01)

(58) Field of Classification Search
CPC ..... G06K 7/0008; G08C 17/02; G08C 19/28

USPC .................. 340/10.1, 12.22, 854.1
See application file for complete search history.

(56) References Cited

U.S. PATENT DOCUMENTS

| | | | |
|---|---|---|---|
| 8,714,879 B1* | 5/2014 | Lugo et al. ................. 405/170 |
| 2001/0029989 A1* | 10/2001 | Paz ......................... F16L 1/11 138/104 |
| 2005/0040950 A1* | 2/2005 | Clucas ....................... 340/572.1 |
| 2006/0109121 A1* | 5/2006 | Dishongh et al. .......... 340/572.1 |
| 2006/0109131 A1* | 5/2006 | Sen et al. ................... 340/572.8 |
| 2007/0209937 A1* | 9/2007 | Hoagland ............ G01N 27/122 204/424 |
| 2008/0173109 A1* | 7/2008 | Cogen et al. ................ 73/865.8 |

* cited by examiner

*Primary Examiner* — Vernal Brown
(74) *Attorney, Agent, or Firm* — Lewis Roca Rothgerber Christie LLP

(57) ABSTRACT

Method for capturing, organizing and retrieving data for utility assets using RFID tags, including: storing data related to a plurality of utility assets in a database, wherein the stored data include data about type of the utility asset; repair, documentation, testing validation, and inspection of the utility asset; programming a plurality of RFID tags for placement on a utility asset, by one or more processors; placing the programmed RFID tags on the utility asset; linking stored data related to the utility asset with the programmed data for the placed RFID tags, including location data of the placed RFID tags; and querying one or more of the placed RFID tags to retrieve data about the utility asset including data about the location of the utility asset, the specific segment and the specific joint, the type of the utility asset; repair, documentation, testing validation, and inspection of the utility asset, by one or more processors.

20 Claims, 12 Drawing Sheets

SYSTEM AND METHOD FOR QUALITY CONTROL, INSPECTION AND AUDIT OF UTILITY ASSETS

CROSS-REFERENCE TO RELATED APPLICATIONS

This Patent Application claims the benefits of U.S. Provisional Patent Application Ser. No. 61/652,781, filed on May 29, 2012 and entitled "System And Method For Quality Control, Inspection And Audit Of Utility Assets," the entire contents of which are hereby expressly incorporated by reference.

FIELD OF THE INVENTION

The present invention relates generally to computer software; and more particularly to system and method for quality control, inspection and audit of utility assets (QCIA).

BACKGROUND

There are many assets above ground and below ground that need to be protected and avoided. Included in these assets are utility lines and components and protected areas, such as archeological sites and habitat of endangered species. There are millions of miles of utility lines around the world, some buried and some above ground. These utility lines include, without limitation, electric power lines, telephone lines, water lines, sewer lines, fiber-optic cable lines, natural gas transmission lines, natural gas distribution lines, and utility lines for transporting hazardous liquids.

Every year incidents occur in which mobile ground breaking equipment comes in contact with utility lines with costly results in loss of life and/or loss of money. In order to understand the full impact of such incidents, one would have to also include environmental damage and economic loss as a result of a service disruption.

There have been many attempts to address damage prevention when groundbreaking equipment is used around utilities and other assets that need protection. Non-exhaustive examples of these attempts include marking the location of a utility by painted lines. Commonly in the past, the utility companies and/or service companies are called to the site to place marks (spray the ground with an identifying color; for example, red for electric lines, yellow for gas lines and so forth) on the surface to show the location of a specific utility line and/or its components. However, such marking is not permanent and typically lasts only for the one earth moving operation, such as digging a trench, for which the utilities were marked.

Another approach was to make a record of the location of the utility lines as the line was placed in the earth. However, the accuracy of the location is dictated by the accuracy of the reference point. It has been found that attempting to locate a utility line based on this record has resulted in an error of up to 15 feet or more because of the inaccuracy in the position of the reference point.

Accordingly, there is a need for a system and method for quality control, inspection and audit of utility assets.

SUMMARY

In some embodiments, the present invention is computer implemented method for capturing, organizing and retrieving data for utility assets using RFID tags. The method includes: storing data related to a plurality of utility assets in a database, wherein the stored data include data about type of the utility asset; repair, documentation, testing validation, and inspection of the utility asset; programming a plurality of RFID tags for placement on a utility asset, by one or more processors; placing the programmed RFID tags on the utility asset. At least one of the programmed RFID tags may be placed on a specific segment of the utility asset as a segment tag, and at least one of the programmed RFID tags is placed near a specific joint of the utility asset as a join tag. The method further includes: linking stored data related to the utility asset with the programmed data for the placed RFID tags, including location data of the placed RFID tags; and querying one or more of the placed RFID tags to retrieve data about the utility asset including data about the location of the utility asset, the specific segment and the specific joint, the type of the utility asset; repair, documentation, testing validation, and inspection of the utility asset, by one or more processors.

In some embodiments, the present invention is computer implemented method for capturing, organizing and retrieving data for utility assets using RFID tags. The method includes: storing data related to a plurality of utility assets in a database, wherein the stored data include data about type of the utility asset; repair, documentation, testing validation, and inspection of the utility asset; programming a plurality of RFID tags for placement on a utility asset, by one or more processors. The programming process may further include: retrieving a unique RFID tag identifier from the RFID tag using an RFID reader device, linking data associated with the utility asset to the unique RFID tag identifier, and checking out the programmed RFID tag from an RFID inventory database. The method further includes: placing the programmed RFID tags on the utility asset; linking stored data related to the utility asset with the programmed data for the placed RFID tags, including location data of the placed RFID tags; and querying one or more of the placed RFID tags to retrieve data about the utility asset including data about the location of the utility asset, the type of the utility asset, repair, documentation, testing validation, and inspection of the utility asset, by one or more processors.

DETAILED DESCRIPTION

Figure 1:
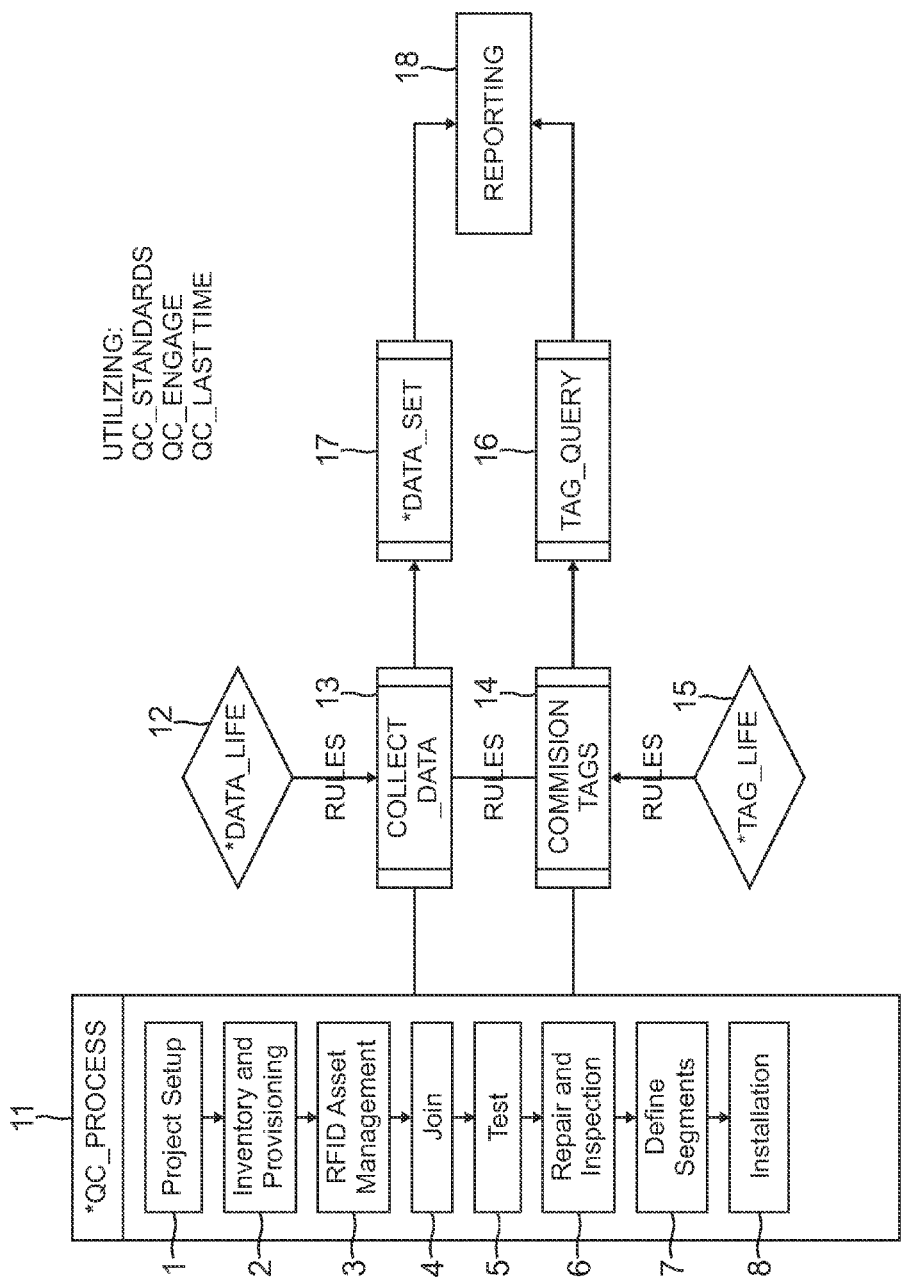
FIG. 1 is an exemplary overview, according to some embodiments of the present invention.

The present invention is directed to a system and method for quality control, inspection and audit of utility assets (QCIA). The invention provides a method and system for locating, tracking, measuring, and documenting the history of critical components of pipeline architecture and relating these components to tags that can be used for onsite validation and location, as required during the life cycle of the utility assets, such as pipeline, and related facilities (INFRA). Some or all of the processes of the invention is executed by one or more computers/processors and may include various databases. The invention assists the over and underground utility assets management for industries such as the oil and gas industries in achieving Pipeline Integrity Management (PIM). Asset (e.g., pipeline) Integrity management is achieved when the facility owner has timely access to comprehensive pipeline configuration data that supports the timely, accurate, cost effective operational life cycle management of pipeline and facilities to include audit, risk assessments, locating, damage prevention, emergency response, repair, maintenance, modifications, compliance and regulatory.

Moreover, the invention provides a proprietary process for collecting data and creating an audited data pedigree related to INFRA. Joint and join and other critical data associated with build and repair of INFRA is linked by a unique identifier to Radio Frequency Identification (RFID) tags, which are placed on or in close proximity to the associated features that are being documented.

In some embodiments, the invention incorporates RFID (or transponders), GPS, GIS and other state of the art data management services and software and hardware technology. The invention introduces new processes for viewing, organizing, collecting, displaying and auditing data and tying or linking this data to facility locations, creating new standards for ensuring that PIM is achieved.

In some embodiments, the invention uses an (on-line) database of pipeline and facilities configuration data that is securely and remotely accessed, for example, from the office or the field. The invention uniquely incorporates the use of RFID technology to tag points and segments of interest on the pipeline and related facilities in a manner that facilitates the audit of key tasks required of the build, repair, inspection, maintenance and validation of the life cycle of the pipeline and related facilities. The invention provides for critical 'last mile' physical and visual validation of infrastructure status including validation of repairs and maintenance. Additionally, the invention supports the full life-cycle documentation of pipelines and related infrastructure, from original engineering data though as-built and beyond and includes collecting and reporting critical field data related to joints, joins and other as-built configurations.

In some embodiments, the invention is utilized for the full spectrum of pipeline configurations and related facilities used in the oil, gas and utility industries. For example, the invention provides the development of audited pipe segment and joint pedigree data sets and an automated process for recalling this data as required for compliance purposes.

Furthermore, the invention takes into consideration all permutations of utility assets (e.g., pipe) types (e.g., metal or plastic) segments. Although for simplicity reasons, the examples about the utility assets given in the present disclosure mainly use a pipeline, one skilled in the art would recognize that the present invention is not limited to pipelines and thus other utility assets, such as electrical lines, phone lines, sewage lines and other assets are within the scope of the present invention.

In some embodiments, the invention supports the gathering of pipeline related data and linking this data with field installed RFID tags (TAGs). TAGs are installed in key locations both above and below ground and on and around pipelines and associated facilities locations. TAGs are unique identifiers and can be queried directly for data that is stored in the TAGs. The invention links TAGs to data that provides highly accurate GPS (X, Y) locations of the TAGs including depth (X, Y, and Z) as well as relevant data associated with the TAGs. GPS data allows for determining approximate locations of buried TAGs, thus allowing for further direct query and linking both above and below ground.

According to some embodiments of the invention, RFID tags (TAGs) of active or passive design, are attached to pipeline and facilities both above and below ground and are readable both above and below ground with new future technologies. The invention also includes a new concept for an RFID reader capable of reading TAGs below ground and the concept that these TAGs utilize attached sensors (TAG_SENSOR) of both passive or active design (utilizing external power sources like batteries) and provide location and data validation as well as sensor readings both above and below ground.

Field workers can query both above ground and below ground TAGs and be automatically connected to applicable configuration and compliance data associated with the TAGs. TAGs are initially installed when INFRA is built or when INFRA is exposed for various (repair or inspection) or any other reason during its lifecycle. The combination of field installed TAGs combined with life cycle pipeline configuration management of data facilitates provides a powerful suite of quality control, risk assessment, damage prevention and compliance services for facility owners and their service companies. Information in the form of a pipeline open data standard (POD), compliant, and/or geospatially enabled data set (DATA_SET) assist professionals with responsibilities in damage prevention and management of assets to make better business and operational decisions. PODS provides pipeline operators scalable database architecture to integrate critical records and analysis data with geospatial location for each component of the pipeline system in a vendor-neutral platform.

Through the use of this information, utility owners will be able to better track their assets and also reduce the likelihood of conflict, damage and resulting losses to their assets that often occur during construction activities.

In some embodiments, the invention is a method and apparatus for capturing and organizing, archiving, retrieving and tagging and locating key information related to the full life-cycle build inspection, testing and repair of oil and gas or other types of pipelines or related infrastructures (INFRA).

In some embodiments, the invention is comprised of a master life cycle process or methodology called the QC process (QC_PROCESS) and the data generated from this process, taken as a whole, provides a quality control, inspection and audit data set and documentation baseline (DATA_

SET) that can be used for due diligence, maintenance, inspection and repair activities during and after INFRA is built or repaired. In some embodiments, DATA_SET creation occurs during the implementation of QC_PROCESS working under the control of QCIA standards (QC_STANDARDS) and processes called WORK_UNIT, DATA_LIFE and TAG_LIFE and operating in a computing system architecture including one or more computing device and is called QC_ARCHITECTURE.

In some embodiments, DATA_LIFE is a method and process that is primarily comprised of automated processes and business rules that control the generation of a complete, secure, Internet accessible DATA_SET of applicable build, test, repair, inspection, compliance and project data associated with INFRA during construction and afterward for the entire INFRA life cycle.

In some embodiments, DATA_SET is data organized under a unique data model that is created and then tied to INFRA points of interest called QC Reference Points (QC_POINTS) and areas or segments of INFRA called QC Segment (QC_SEGMENT) via the use of different types of RFID tags (TAGs). TAGs are geospatially referenced and are tied back to DATA_SET data via a unique TAG identifier called (TAG_ID). (TAG_ID) serves the purpose of identifying the unique type of TAG (TAG_TYPE) and a unique identifier for the TAG within the context of each QC_PROCESS and an absolute unique identifier for the tag itself.

In some embodiments, TAG_LIFE controls the life cycle of the management of TAGs during the QC_PROCESS and is integrated with the DATA_LIFE process. TAG_LIFE controls the TAG life cycle of an INFRA project that is being controlled by the QC_PROCESS and includes initial commissioning of TAGs, tying of tags to DATA_SET data and the rules for placement of TAGs during the QC_PROCESS. The primary sub process of TAG_LIFE is called OPEN_TAG-CLOSE_TAG. This process combines collection of data with the tagging of INFRA. OPEN_TAG-CLOSE_TAG ensures that the accomplishment of work (WORK_UNIT), data about the work (DATA_SET) and tagging of INFRA is integrated. OPEN_TAG-CLOSE_TAG provides for the non-linear or non-sequential commissioning, tie to DATA_SET, placement, and audit of each type of TAG thus guaranteeing that the TAG fully supports the QCIA concept of LAST_MILE validation.

Audit of the collection of data, inspection, completion of tasks and tagging is controlled by an automated QCIA process called WORK_UNIT. WORK_UNIT process divides or parses INFRA related build, test, inspect, and repair tasks into identifiable units of work called WORK_UNITS. WORK_UNITS are a natural grouping (NATURAL-GROUPING) of tasks or actions and collection of associated data about the task (who, what, when, where and how) and related audit data about those tasks. WORK_UNITS are defined based upon criteria and business rules set by the QC_PROCESS and may be different depending on the application of QC_PROCESS to different types of jobs that affect INFRA.

The QC_PROCESS generates a DATA_SET by gathering data from multiple sources during the life cycle of INFRA and provides the ability to find and locate and validate QC_POINT and QC_SEGMENT of INFRA on location and tie the data and the validation together even years after INFRA has been completed or changed ownership and management control multiple times.

FIG. 1 is an exemplary overview of the present invention. In some embodiments, the invention include the following components or methods. Each of the components and methods is comprised of a number of new and unique automated sub-processes.

Block 11 of FIG. 1 is an exemplary conceptual representation of some of the functional processes that constitute the QC_Process, according to some embodiments of the present invention. This block is conceptual only and does not represent the complete set of processes of the QC_Process. Each feature module of the QC_PROCESS utilizes and/or operates on existing or new data and is executed on one or more processors and/or computers. The features shown in blocks 12 through 18 are all applicable to each operation that is represented conceptually in block 11. In other words, as a feature (e.g., TEST) is being performed (e.g., by a processor), the data management, data control, query and reporting functions are applied to it, during its life cycle in completing the feature.

DATA_LIFE 12 and TAG_LIFE 15 are Data and RFID chip management processes and standards that are applied in creating DATA_SET 17. DATA_LIFE 12 includes rules and standards for collecting data at different points during the QC_PROCESS 11. TAG_LIFE 15 includes process of managing the life cycle of TAGs from initial commissioning through installation and geospatial referencing.

COLLECT DATA 13 represents the varied methods that are used at various points in the QCIA process to collect applicable data at applicable times during the QCIA process.

COMMISSION TAGS 14 represent the process that manages RFID tags from a project inventory standpoint and provides them to the field for implementation using the TAG_LIFE process. It represents the process of checking RFID tags out of inventory and placing the TAGs on the infrastructure that is being built or repaired. COMMISSION TAGS is dependent on the TAG_LIFE process 15.

TAG_QUERY 16 represents the query of TAGS after they have been placed on the infrastructure. Query of TAGS can take place at any time during the QC_Process, from the initial reading of TAG unique ID information to the query of TAGS years after the tags have been placed. TAG_QUERY is closely tied to and utilizes DATA SET 17 includes the data about the TAG. When a TAG is queried, it uses the unique identifier on the TAG to access data about the TAG. The data about the TAG is a part of the DATA_SET 13, which was developed during the COLLECT_DATA function, under the guidance and standards of the DATA_LIFE process or methodology.

REPORTING 18 represents top level and detailed reports that are generated from the DATA_SET 17, for example, based on security rules and standards. Reporting is generated as required using a variety of reporting tools and using DATA_SET data as its basis.

Figure 2:
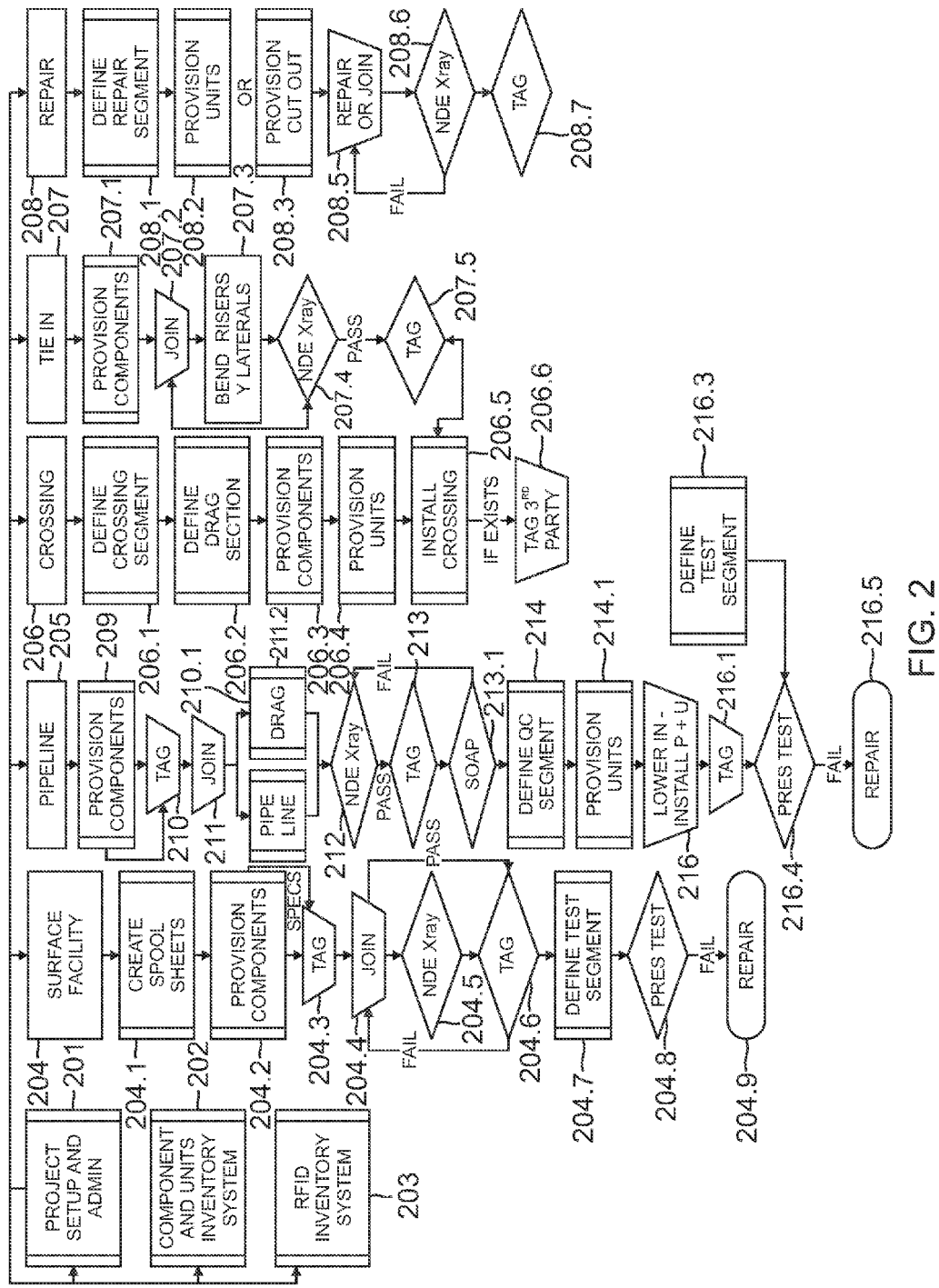
FIG. 2 is an exemplary process flow, according to some embodiments of the present invention.

FIG. 2 is an exemplary process flow for a QC_PROCESS, according to some embodiments of the present invention. In some embodiments, QC_PROCESS utilizes and incorporates the following modules. PROJECT SETUP AND ADMINISTRATION (ADMIN) 201 is a setup of project level information including facility owners, engineering specs, operators, operator qualifications etc. ADMIN data is linked to various operational steps as required during the build of the system. For example, Operator Qualifications (OQ) data is utilized downstream of the project setup during the JOIN QC_PROCESS to identify welders doing the actual work of the join QC_PROCESS.

COMPONENTS AND UNITS INVENTORY SYSTEM (INVENTORY) 202 is a QC_PROCESS. This module provides for the inventory and provisioning and collection of relevant specification data related to material used in the build which are pipeline COMPONENTS AND UNITS. In some embodiments, pipe and fittings are unloaded in an area easily accessible for the workers. The material is tagged and inventoried as it is off loaded and sorted into identified areas. For example, a QC hand or fitter can request fittings, which are signed out to a spool sheet number. A welder can then join them and return the completed sheet to the QC hand or the fitter.

RFID INVENTORY SYSTEM 203 is a data management and inventory control and field commissioning (COMMISSION) of TAGs and supports TAG_LIFE process. SURFACE FACILITY (FACILITY) 204 is a QC_PROCESS step that supports design, build, testing and inspection of pipeline surface facilities. PIPELINE 205 is also a QC_PROCESS step that supports design, build, testing, installation and inspection of pipeline.

CROSSING 206 is also a QC_PROCESS step that supports definition, build, test and inspection and installation of pipeline crossings. This QC_PROCESS step has a tie-in at both ends where the mainline connects to the drag sections. The new line may cross one or many utilities in the same crossing. The crossings are numbered. The entry and exits are recorded as are the tie in welds and crossing information.

TIE-IN 207 is also a QC_PROCESS step that supports definitions of tie-ins and build test and inspection of TIE-IN. This is the QC_PROCESS that completes the pipeline from the start point to the completion point. It may, at times, require a HOT TIE-IN meaning being tied into a live line or facility. Tie-ins may be loose ends left for slack control, risers, underground branch connections, expansion loops or facilities above ground.

REPAIR/INSPECT 208 is also a QC_PROCESS step that supports definitions of repair and inspection activity and repair and inspection of repair and inspection segments of existing pipelines. This is the QC_PROCESS that outlines how an existing pipeline that has anomalies is inspected internally or directly and repaired. It may be as simple as repairing the external coating, adding an external sleeve to contain pressure or as complicated as doing a section cut out and replacing the cut out with a piece of pre tested pipe.

PROVISION COMPONENTS 209 provisions the pipeline components from inventory and in doing so provides material information related to the actions taking place on INFRA. For example, provisioning of pipe segments into a JOIN WORK_UNIT include the manufacturer and heat numbers of the pipes. TAG 210 is a WORK_UNIT sub task. COMPONENTS (pipe, valves, flanges) are tagged from an INVENTORY perspective prior to their use in the field.

JOIN 211 works for a WORK_UNIT. Typically, joining comes after stringing of components. JOIN 211 can be steel or non-steel (plastic). The join is typically tested by NDE and sometimes destructive methods and this data will be entered via the ADMIN part of the QC_PROCESS. The welders are tested to the procedure required for the type of pipe used. The plastic technician's first join are also tested, for example, by a destructive method. All technician information is documented.

NDE XRAY 212 is a non-destructive X-ray of weld accomplished by JOIN 211. XRAY is done by separate X-ray crews and data is added in order to close the JOIN WORK_UNIT and the TAG that is attached at the JOIN QC_POINT. TAG 213 is placed per QC_STANDARD at a QC_POINT upstream or downstream of the JOIN. TAG references and ties data to a QC_POINT related to a JOIN, repair or other action taken on the INFRA. It differs from the previous TAG which has material or inventory data emphasis.

QC_SEGMENT 214 is defined to describe the environmental conditions of the ditch into which the lower in or install of the pipeline is taking place. Other QC_SEGMENTs are defined as required to circumscribe pressure test areas and other segments of INFRA that may be of interest to inspectors later in the life-cycle of INFRA. LOWER IN 215 installs WORK_UNIT. In some embodiments, the installation QC_PROCESS includes ditching, soap testing, sizing pig/gauging (surface) lowering in, holiday testing, coating repair and backfill. It also includes unit installations. All operations within this QC_PROCESS are watched and acknowledged by entries into the hand held device.

FIG. 2 represents a reads process flow, according to some embodiments of the present invention. The critical path methodology and practices of the QC_PROCESS INTERACT with and act as an EXTENSION to standard build and repair practices in the Oil & Gas Pipeline industry. The QC_PROCESS is APPLIED TO and DURING and IN ADDITION TO, normal pipeline, build repair and maintenance activities. FIG. 2 SHOWS AN INTERLEAVED VIEW OF QC_PROCESS FUNCTIONS THAT ARE EITHER NEW OR ARE DIRECTLY APPLIED TO NORMAL INFRA BUILD REPAIR AND MAINTENANCE FUNCTIONS. Appendix A of the Provisional Patent Application Ser. No. 61/652,781, the entire contents of which is already expressly incorporated by reference, provides a more detailed description of FIG. 2.

Figure 3:
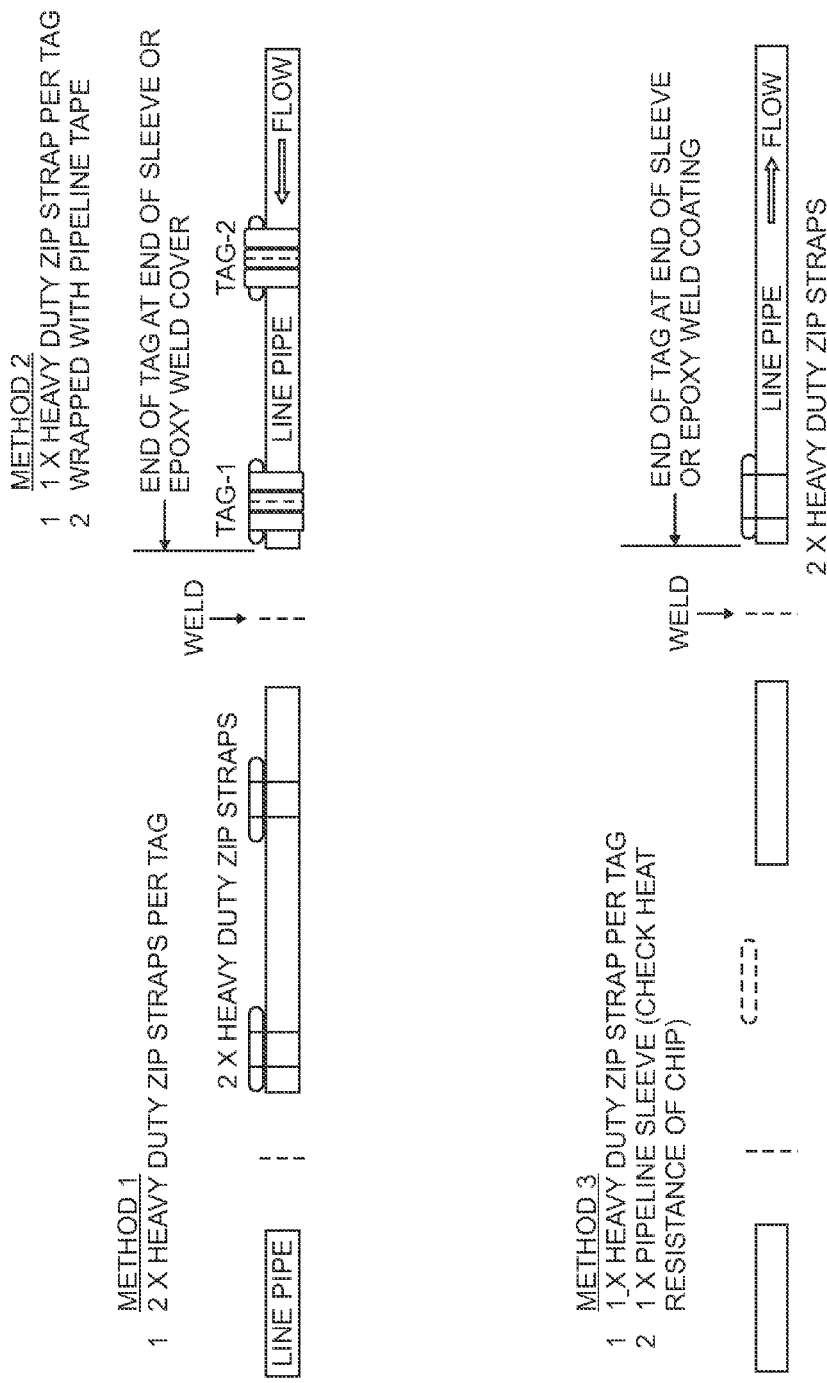
FIG. 3 depicts an exemplary method for tag placement of an utility asset, according to some embodiments of the present invention.

FIG. 3 shows exemplary methods for tag placement of the utility assets, according to some embodiments of the present invention. In some embodiments, the invention creates a multifaceted set of methods/standards (QC_STANDARDS) that are applied throughout the QC_PROCESS. QC_STANDARDS apply to data schema and model, process and procedures, TAG physical configurations and placement on INFRA and TAG read or writes both above and below ground and audit and compliance and public and private interface and access to DATA_SET.

The following are few examples of the methods/standards that the present invention creates:

ADMINISTRATIVE—Standards for collecting administrative data related to INFRA projects.

ENGINEERING—Standards relate to provision of engineering formulas and calculations that are utilized by the system.

FIELD INVENTORY—Standards for naming and numbering field components and units within the context of INFRA projects and also within the context of linking with upstream manufacturers.

RFID INVENTORY—Standards for naming and numbering RFID TAGs within the context of INFRA projects and uniquely per TAG in order to tie them to data associated with them.

WORK UNIT—Standards for the scope and data requirements associated with units of work associated with INFRA projects to ensure compliance and PIM.

TAG_LIFE—Standards for the commissioning, placement, geospatial referencing and linkage to data of RFID tags used in INFRA projects.

DATA_LIFE—Standards for the life cycle development and collection and audit of data associated with INFRA projects.

DATA_SET—Standard data model that is PODS compliant and generically useable by various geospatial computing environments.

GEOSPATIAL—Standards for the collection of geospatial data in accordance with accepted methods and best practices and in particular related to QCIA TAGs.

QUERY—Standards for query of RFID data in the field and for public and private access of related data including national security requirements and other safety requirements.

ENGAGEMENT—Standards for required engagement of inspectors and their proxies in the field in order to assure proper data collection, oversight, and audit during the QC_PROCESS.

AUDIT—Standards to ensure that sufficient data has been collected for each unit of work in support of the PIM goal.

COMPLIANCE—Standards to ensure that data acquired is supportive of compliance requirements associated with WORK_UNITS.

LAST MILE VALIDATION—Standards related to the placement, color and type of TAGs that inherently provide validation and information both visually and via electronic means of what is being seen on the INFRA.

SECURITY—Standards related to data security and compliant with Industry and national standards as required.

During the application of the QC_PROCESS by the QCIA program, various points and segments of interest are identified for data collection, documentation and audit. Points of interest are called QC_POINTS, segments are called QC_SEGMENTS. Components and units that are used to build the pipeline are also tagged with INVENTORY tags. The TAG_LIFE standard sets forth the configuration of the TAGS, their placement on INFRA and the linkage of the TAG to the appropriate DATA_SET associated with that TAG.

The results of the application of the standard TAG_LIFE determine various methods of attaching RFID TAGs to sections of pipe. The TAG_LIFE standard sets parameters for the placement and spacing of TAGS near or around or upon various components of INFRA.

As shown in FIG. 3, METHOD 1 shows an RFID tag attached to a pipe section with 2 HEAVY DUTY ZIP STRAPS. METHOD 2 shows an RFID tag attached to a pipe section with (1) 1 heavy duty strap per tag and with the RFID tag wrapped with pipeline tape. Note that the RFID TAG shown in METHOD 2 is shown placed with the End of tag at end of sleeve or epoxy weld cover.

METHOD 3 shows and RFID TAG placed on a pipe section using a 1 heavy duty zip strap per tag and a 1 pipeline sleeve (assuming proper heat resistance of the chip). Note that the tag is again placed in a standard position from the weld based on TAG_LIFE standards.

Tags may be of different colors and form factors for placement on various types of surfaces. The following is an exemplary list of different color schemes, according to some embodiments of the present invention:

Yellow Tag: Inventory Tag—formed to pipe diameter. Tag placed on pipe during stringing operation used below ground 1 to 3 tags used. Tag is linked to the joint work unit. Also used for vessels & tanks.

Green Tag: Inventory Tag for flanges, fittings. Formed or flexible and usually used above ground. Tag is linked to the flange or fitting work unit.

Blue Tag: Inventory Tag—For above ground Pipeline units. Used to Tag surface components attached to the buried pipeline. Tag is linked to the Pipeline Status work unit.

Red Tag: Join Tag; to be used for each joint. Placed on the upstream side of joint. Tag is linked to the join work unit.

Orange Tag: Tie-In Tag; used for each tie-in placed on the up-stream side of JOIN. Tag is linked to the tie-in work unit Black Tag: Valve Tag; used for each valve & Actuators. Placed on the valve body. Tag is linked to the valve work unit The following is an exemplary list of different tag types, according to some embodiments of the present invention:

Pipe Joint Seamless pipe. Used for surface piping. Linked to Inventory Pipe work unit.

Heat Zone This zone will be affected by welding heat

Flange—For connecting pipe lengths usually on the surface. Formed or flexible and usually used above ground. Tag is linked to the flange or flange work unit Fitting Tag is placed in the center of fitting. Formed or flexible and usually used above ground. Tag is linked to the flange or fitting work unit Valve (flanged)—Tag is placed on the side of valve flange. Formed or flexible and usually used above ground. Tag is linked to the flange work unit Valve (Welded/Threaded)—Tag is placed on the side of valve Body. Formed or flexible and usually used above ground. Tag is linked to the valve work unit Nipple (TBE)—Nipple is considered pipe. Tag is linked to the pipe inventory work unit. Also used for vessels & tanks Weld-O-Let—Fitting Tag is linked to the fitting inventory work unit. Also used for vessels & tanks Pipeline—Line pipe underground—Shows tag placements Join Area—Join coated with plastic sleeve or epoxy.

Surface Pipeline warning sign—All pipelines are required by law to have signs spaced along the ROW over the line. Tag is linked to pipeline Status work unit Cathodic test post—All pipelines are required by law to have Cathodic posts along the ROW over the line. Tag is linked to pipeline Status work unit In some embodiments, QC_PROCESS requires a user to interface (QC_ENGAGE) with INFRA activities in order to collect data. The primary method for forcing this engagement, above and beyond the process itself, is the audit program which, when executed, notifies the inspector of information that must be collected related to QC_POINTS and QC_SEGMENTS within the context of WORK_UNIT. If required data is not collected, or is outstanding based on system criteria, the audit function will flag this shortfall of data and who (inspector or proxy) is responsible for this non-compliance.

In some embodiments, QC_ENGAGE facilitates the engagement of inspection resources in an optimized manner. QCIA provides field data collection devices and resources that facilitate and supports the various types of data collection and interface and presence including data collection, photographs, voice, videos, location (e.g., GPS) points and RFID TAG reads and writes provided in the form of ruggedized and explosion proof certified field computing devices.

In some embodiments, a QC SEGMENT is an automated process that organizes data in groupings associated with segments of a pipeline or utility installation that have attributes that point to or indicate possible anomalies or inspect regimens that are applicable to these regions.

Figure 4:
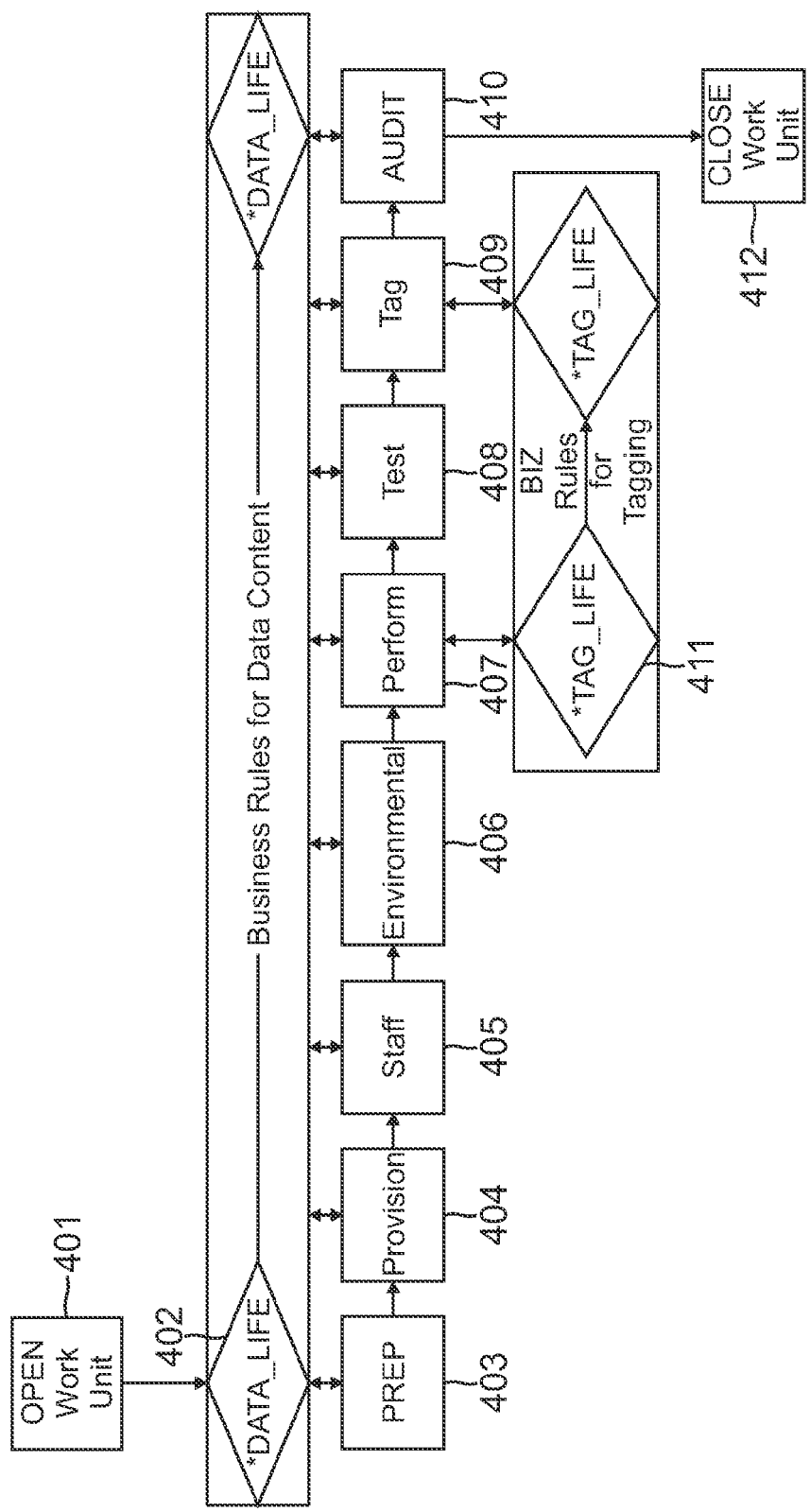
FIG. 4 is an exemplary process flow for the opening and closing of a file or data set of information, according to some embodiment of the present invention.

FIG. 4 is an exemplary process flow for the opening and closing of a file or data set of information, according to some embodiment of the present invention. The QC_PROCESS incorporates WORK_UNIT, which is the logical division of work into centers of activity that require audit in support of PIM. WORK_UNIT is logically connected to QC_POINTS and QC_SEGMENTS. QC_POINTS and QC_SEGMENTS are locations and boundaries that are tagged and identify areas and points of data collection interest during the life cycle of INFRA and tagging is controlled by the TAG_LIFE process.

In some embodiments, the invention logically divides or groups (NATURAL_GROUP) INFRA projects into WORK_UNIT and applies data collection and audit criteria to each unit of the WORK_UNITS. In some embodiments, Data and meta-data associated with a WORK_UNIT is collected just in time (JIT) as data is completed or available, but not necessarily in a linear sequence. The invention audits to validate that all data required for audit or compliance of a WORK_UNIT is complete, in the field or afterward.

In some embodiments, WORK_UNIT includes OPEN_WORK and CLOSE_WORK automated processes that systematically define the business rules for the opening and closing of, in effect, a file or data set of information on each WORK_UNIT. OPEN_WORK and CLOSE_WORK do not require sequential processing but allow for the fact that data is available at different times during the course of work on INFRA. For example, a Repair WORK_UNIT may be closed and audited days after the repair is covered over and buried. Audit functions as a QC check to make sure that all data required to close a WORK_UNIT has been acquired.

In some embodiments, OPEN WORK UNIT and CLOSE WORK_UNIT include the following processes, executed by one or more processors:
  Open WORK_UNIT by the QC_PROCESS system interface.
  Control the acquisition of data by DATA_LIFE.
  Set up and collect Prep data for the work that is to be done.
  Set up Provision of materials and collect as materials for the job are provisioned and provided in the field.
  Create Staff manifest which tells system who is doing the work. Operator qualifications have previously been entered into the systems.
  Capture environmental data concerning the conditions under which the work is being. This includes ambient temperature, soil conditions etc.
  Perform work collect and appropriate data regarding the work accomplished.
  Test work. Test results are captured on site or are available afterward.
  Tag POINTS OR SEGMENTS.
  Control the standards and methods applied to tagging by TAG_LIFE process.
  Run AUDIT program against the WORK_UNIT to test that all data has been collected.
  Close WORK_UNIT based on AUDIT results.

OPEN_WORK_UNIT—CLOSE WORK_UNIT are logical sequence of data collection and the tagging of infra associated with a logical grouping of work. For example, the repair of a discrete section of pipe could be a WORK_UNIT.

Block 401 represents the beginning of the WORK_UNIT process. The QCIA system allows the project engineer of field manager to define a WORK_UNITS (such as a discrete pipeline prepare as a WORK_UNIT.

Block 402 represents the fact that the QCIA system of the invention is applying an overarching set of data collection standards which is called the DATA_LIFE process to the collection of all data associated with the WORK_UNIT. DATA_LIFE is a business rules based set of standards that ensures that all required data is collected in the context of the needs of the particular type of work being done (the WORK_UNIT) defines the particular type of work being done and defines the data required to complete the audit function.

The invention provides the ability to configure the data needs associated with the work done in various types of WORK_UNITS. This gives the operator the ability to customize the business rules associated with various types of work being done in the field. Business rules and data requirements may change between build, repair or maintenance activities and the DATA_LIFE standard enforce these rules by requesting data inputs at various stages of the completion of the WORK_UNIT.

In some embodiments, the invention uses a just in time (JIT) data collection concept. Data is collected when it is appropriate to collect the data. For example, ambient temperatures needs to be collected at the time that a JOIN (weld) is being performed. Data in the JIT concept does NOT have to be collected in any particular sequence or order, but it need to be collected based on the business rules set that apply to the particular type of WORK_UNIT being undertaken.

Block 403 represents the collection of all data associated with the preparation (PREP) of the work to be done in order to complete the WORK_UNIT. Examples of this data are administrative project information, worker qualifications, ownership etc.

Block 404 represents the collection of data associated with the provisioning (PROVISION) of components and units. For example, as pipe segments, flanges and pipe weights are provisioned out of inventory into the field in support of the repair, data is collected about each of these components and units.

Block 405 represents the collection of staff and worker information (STAFF). As an example, data associated with the field testing of welders can be collected at this point.

Block 406 represents the collection of environmental data (ENVIRONMENTAL) associated with both weather and ditch conditions. For example, the ambient temperatures that exist during a repair that involves welding, is critical information and the conditions of the ditch (wet, dry, frozen) is also critical.

Block 407 represents the performance (PERFORM) of the primary action of the WORK_UNIT. For example, if the WORK_UNIT is a pipeline repair, the primary PERFORM function may be the cutting out of a damaged section of pipe, the welding in of a new section and the disposition of the damaged section. Any PERFORM function will require the application of a number of standard modules that are provided by the system. For example, the previously described repair would require the JOIN module, INSPECT module and TEST module in order to collect all data associated with the repair and to appropriately TAG the repair.

Block 408 represents the testing and inspection (TEST) of the work that has been performed in block 407. For example, during a pipeline repair that involved a JOIN in block 407 there would be pressure testing on the pipe segment as well as NDE X-ray of the JOIN.

Block 409 represents the tagging (TAG) of appropriated sections of the INFRA. For example, if a section of pipe has been cut out and a new section is joined, the JOIN will have a JOIN TAG placed in a location near the JOIN. The placement of the TAG in relationship to the location of the JOIN, the color of the TAG and the data associated with it are controlled by the business and rules provided by the TAG_LIFE process.

Block 410 represents an audit function. The audit function is a business rules driven process that validates that all required data collection and tagging functions have been performed based on business rules and parameters set by the administrative set up of the WORK UNIT. The audit function performs a query of the existing data base of collected data and the data associated with validation of proper tagging processes and delivers a real-time status to the field or the office operator. For example, after a pipeline repair has taken place, but before the ditch has been covered, the audit function can be run to see if any data associated with the repair is missing. A WORK_UNIT cannot be closed (from and audit standpoint) unless all data, as set forth in the business rules and all tagging as set forth in the rules has been completed.

Block 411 represents the control of tagging controlled in blocks 407-409 of the WORK UNIT by the TAG_LIFE standard and process. TAG_LIFE is crucial to making sure that work that is done on INFRA is properly tagged and that the TAG is properly installed, the GPS data included f and that the TAG is linked to data associated with the TAG. For example, a JOIN TAG may be placed (under the standards of TAG_LIFE) at a certain position next to the actual joint on the pipe. The installed tag may be a certain color and may include location (e.g., GPS) data. All of these activities are controlled by TAG_LIFE. The AUDIT function also queries TAG_LIFE to validate that the install and linkage of the TAG and associated data are completed.

Block 412 represents the logical closing of the WORK_UNIT from a data collection and tagging perspective. For example, if the WORK_UNIT was a pipeline repair, all data required to document the repair has been collected and the repair has been tagged, the tag also includes location (e.g., GPS) data to establish its location. The audit program has been run validating the completion of all data collection and tagging tasks. The pipeline repair is fully documented.

In some embodiments, the invention incorporates an automated process, executed by one or more processors, for identifying points of interest (QC_POINTS) and segments (QC_SEGMENTS) of interest on INFRA and collecting sets of data associated with these points and tying these points and associated data to TAGs both above and below ground. QC_POINTS and QC_SEGMENTS are data model attributes of DATA_SET.

In some embodiments, QC_POINTS includes the following types:
1. Components—INFRA components like pipes, fittings and flanges.
2. Units—INFRA units like weights.
3. Joins—Welds and joins of INFRA.
4. Repairs—Repairs to INFRA
5. TIE-INS—Tie-ins to INFRA
6. Crossings—Third party crossings of INFRA or other utility assets, archeological sites, or other restricted areas, or crossings of roads, rivers etc.
7. Starts Ends—Beginnings and ends of QC_SEGMENT.

In some embodiment, a wide variety of features and areas may be presented by or attached on a pipeline or other INFRA that qualify either as QC_POINTS or QC_SEGMENTS as part of the QC_PROCESS implemented by the QCIA system, according to the present invention.

A QC_POINT represents pipeline cut out/repair, pipeline warning sign, and an underground tie-in (Junction). If the pipe has leaked or ruptured, a section (Cut Out) is removed and replaced with new pipe that meets or exceeds the specs of the cut out pipe. Warning signs are required by code to be spaced at set intervals along the pipeline and at crossings.

Figure 5:
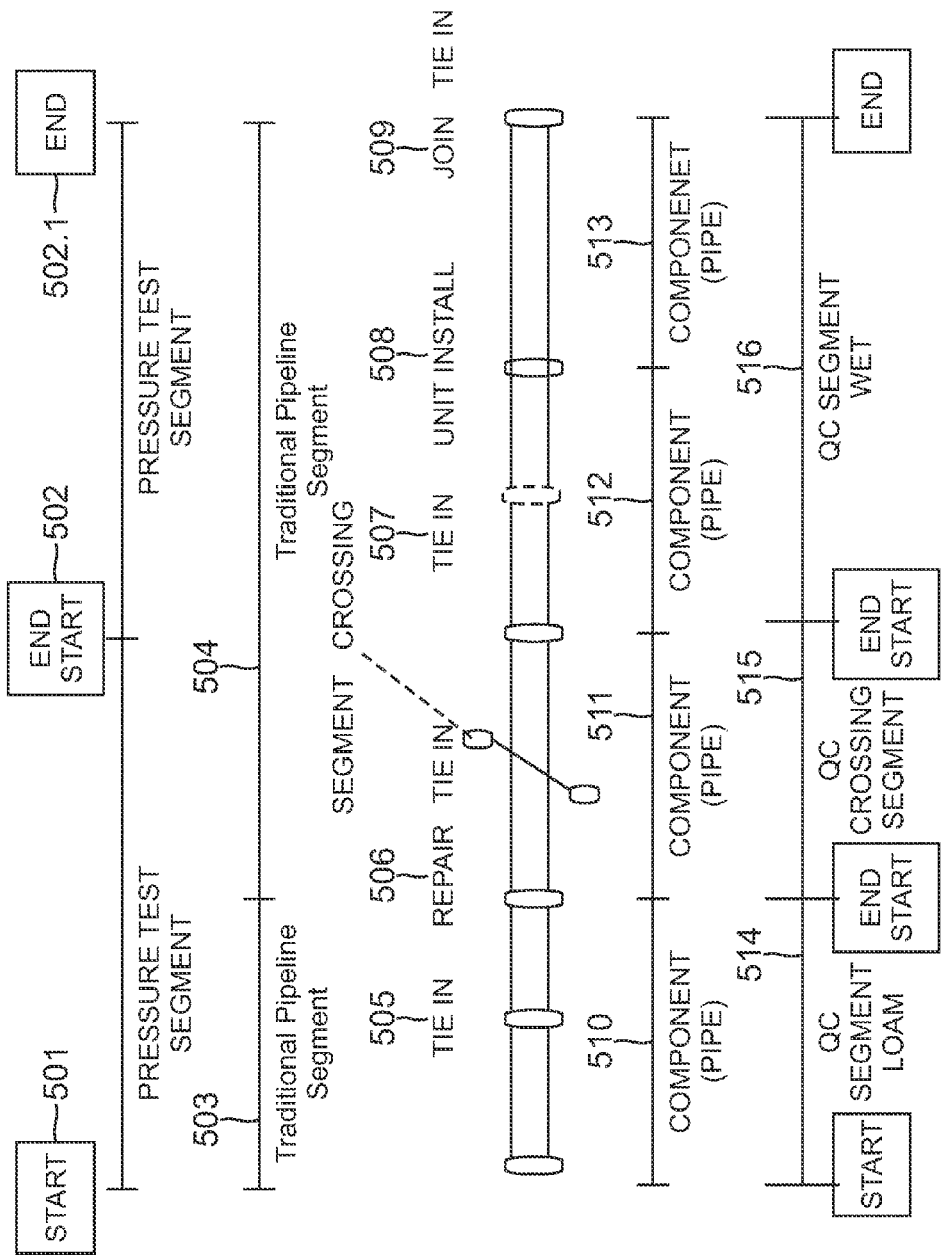
FIG. 5 depicts an exemplary QC_SEGMENT, according to some embodiments of the present invention.

FIG. 5 depicts an exemplary QC_SEGMENT, according to some embodiments of the present invention. In some embodiments, the invention derives or creates a new inspection centric view (IC_VIEW) of INFRA, especially in regard to a pipeline infrastructure. A QC_SEGMENT is a logical segment of a pipeline that has a beginning and an end and which provides a special area of interest for the purpose of test or inspection. For example, pressure tests are completed on subsections of pipeline and these subsections are defined ad hoc from one point of the pipeline to another based on multiple considerations at the time of the test. Data about the test and the actual segment of the INFRA involved in the test is circumscribed and identified by the invention as a QC_SEGMENT and is called a TEST_SEGMENT.

QC_POINTS or QC_SEGMENTS are defined by the QCIA system as points or sections that are to be tagged with RFID TAGS. The type of TAG and the placement of the TAG at each point or at the beginning or end of each segment is defined and controlled by the TAG_LIFE process that is configured with TAG and tagging related business rules by the system at the beginning of each job or project. It is noted that inventory items are tagged with INVENTORY_TAGS. Pipeline components and units that are provisioned into the field and installed are tagged as inventory, but are not normally geo-referenced with regard to their location. It is possible that a pipe segment would have several tags, inventory tags that tie in information about the specifications of the pipe and QC_POINT Tags that show key points on the pipeline like JOINS. A section of pipe could also have a beginning of QC_SEGMENT or end of QC_SEGMENT tags. Inventory tags are typically not geo-referenced all other tags are normally geo-referenced.

A QC_POINT may include a Pipeline Riser, The riser brings the sub surface pipe to the surface to tie into a facility. A QC_POINT may also include a Pipeline Transitions. Usually a 3' piece of pipe that is machined at each end to match line pipe and riser. Because surface pipe and line pipe are different in thickness and property make up a transition piece must be welded in.

A QC_POINT may include THRUST/ANCHOR made of concrete or steal. THRUST/ANCHOR are used to hold pipe in high pressure and expansion situations. A QC_POINT may include PIPE EXPANSION. Due to heating and cooling the pipe expands Line pipe is designed to allow for pipe expansion due to temperature of the product. A PIPELINE WEIGHTS may also be represented by a QC_POINT. Usually made of concrete and bolted on or saddled on using no bolts, pipe weights are used in none trenched water crossings, flood plains and muskeg to stop the pipe from floating.

A PIPELINE SAG may also be represented by a QC_POINT. A bend pulled in the line pipe. A pipe sag is a engineered bend to drop the conform the pipe to the ditch bottom. A QC_POINT may include Pipeline Overbend. A bend pulled in the line pipe. A pipe over bend is a engineered bend to drop the conform the pipe to the ditch bottom A PIPE JOIN, which is a method of joining pipe in a continuous string a pipe join could be welded, mechanical or fused, may also be represented by a QC_POINT. A ROCK SHIELD START may also be represented by a QC_POINT. The start of pipe protection Rock shield is used to protect the external pipe coating; start include GPS data. A QC_SEGMENT may include a ROCKSHIELD END. The end of pipe protection Rock shield is used to protect the external pipe coating and includes location (GPS) data.

An INVENTORY TAG represents a line pipe. A joint of pipe that is externally coated and may be internally coated, in lengths of 20'-40'- or 60' Line pipe is specifically designed for the product, pressure and environment and comes in triple, double and single random lengths.

A QC_SEGMENT represents a CROSSING ENTRY; the up-stream entry point of where the drag section joins the mainline Crossing entry is the beginning of the crossing bore whole or open cut on the upstream side of pipeline. A OBJECT CROSSED may also be represented by a QC_POINT. The object crossed could be a roadway, railroad, water course, another pipeline, or cables An OBJECT CROSSED may also be represented by a QC_POINT. There can be multiple items in a single crossing. A QC_SEGMENT may include a CROSSING EXIT, the down-stream exit point of where the drag section joins the mainline. Crossing exit is the beginning of the crossing bore hole or open cut on the down-stream side of pipeline.

A PIPELINE SIDE BEND may also be represented by a QC_POINT. A SIDE BEND changes direction of the pipeline. A QC_POINT may also represent a DITCH/DRAINAGE. In mild to severe elevation changes, DITCH blocks are used to keep the ditch soil material in place and safe from erosion. A SURFACE DRAINAGE may also be represented by a QC_POINT. Surface drainage items are put in place to direct water off the right of way.

A QC_POINT may represent cathodic test post. Test posts are put in place on the surface so corrosion technicians can take cathodic current readings and coating holiday repairs. Coating holidays repaired during construction are weak points in the coating integrity and need to be tracked as a point of later inspections. A QC_POINT may also represent an in line surface facility. A surface facility is a component, unit, compressor station, pump station, gas plant or any apparatus a pipeline is connected to for separation, storage and or processing the product transported by the pipeline.

As another example, pipelines may travel through ditches in which environmental conditions of the ditch can change, sometimes, radically. For instance, a ditch may begin in sand and then travel through mud and water. From an inspection point of view, anomalies of a specific type over time would be expected based on the change in environmental conditions within the ditch. The invention defines changes in environmental conditions of the INFRA within a QC_SEGMENT which might be called DITCH_SEGMENT. DATA_SET information regarding the DITCH_SEGMENT could lead future inspection to specific QC_SEGMENTS and provide for a highly efficient and cost savings approach to inspecting and testing based on assumed or expected problems associated with the QC_SEGMENT.

In some embodiments, a QC_SEGMENT may be tagged at the beginning of the segment and at the end of the segment. Each tag is geo-referenced so that the segment, and all QC_POINTS and all data associated with that segment can be viewed as one grouping of data.

A QC_SEGMENT differs from a pipeline segment in that a QC_SEGMENT is primarily designated on the basis of changes in the environmental conditions within the pipeline ditch itself. The segment provides inspectors and engineers with information that will lead them to look for particular types of anomalies that arise under the varying environmental conditions described by the QC_SEGMENT.

A pipeline is typically made up of pipe segments welded, or somehow joint together. There may be a one to one correlation between a pipeline segment and a QC_SEGMENT, but more often there will be multiple QC_SEGMENTS within the boundary conditions of a traditional pipeline segment. For example, two pressure test QC_SEGMENTS that overlay may designate the starting and end points of two separate pressure tests that were done on the pipeline, and two traditionally designated pipeline segments may belong to the same pipeline.

Also, individual QC_REFERENCE POINTS may designate points of interest on the same section of pipeline. Moreover, a QC_SEGMENTS may designate change in environmental conditions in the ditch along the length of the pipeline.

A pipeline can have from one to multiple test segments and for many reasons, for example, a Start Point Pressure Test, which includes location (e.g., GPS) data. Typically, the test segments are not tied together until the tests are successful. Each test segment is numbered and GPS's at start & finish of segment. The test info are linked to the test results.

A pipeline may also have from one to multiple test segments and for many reasons, for example, End/Start Point Pressure Test, which includes GPS data. The test segments are not tied together until the tests are successful. Each test segment is numbered and its GPS data is collected at start and end of the segment. The test info are linked to the segment numbers.

End Point Pressure Test, which includes GPS data, represents the end of pressure test segment and pipeline segments designated as such, may use traditional definitions of pipeline segments. In some embodiments, a pipeline segment starts with the pipeline start point and continues until one of the following happens:

1 The design of the pipe changes,
2 The pipe ties into a facility, valve station or another pipeline,
3 The pipe passes from one class area into another class are, or
4 The pipe passes through a state, provincial or country border.

Tie-In QC_POINT is tied into a riser, expansion loop, underground tee, y-lateral, WOL, etc., and a Join is tagged with links to the tie-in information. Repair QC_POINT (which may include GPS data) may be a coating, repair or; a pipe cut out, or a mechanical repair, cut outs and mechanical repairs and is tagged.

Crossing QC_SEGMENT represents the installation of units such as swamp weights, thrust or anchor blocks, casing, cathodic posts, epoxy coatings, coatings, rock shield, sand, ditch blocks, expansion loops, insulation etc. The beginning and end points of the segment include GPS data and are tagged.

Unit Install QC_POINT represents the installation of units such as swamp weights, thrust or anchor blocks, casing, cathodic posts, epoxy coatings, coatings, rock shield, sand, ditch blocks, expansion loops, insulation etc. These items includes GPS data when in place. The surface units like casing vents, cathodic posts, risers, and pipeline warning signs are tagged with pipeline information and include GPS data.

JOIN QC_POINT represents the joining of individual pipe to another pipe that will constitute a segment, by welding, fusion or mechanical means. Each join is tagged with links to the welding information.

QC Segment Identified by the type of ground may be observed while ditching operations are being carried out. The QC section is identified by GPS at start and finish. A pipeline could have only one QC segment or multiple segments. A Crossing Segment (drag section) is tagged and includes GPS data. TAGS are linked to crossing information. If the drag section was installed through a bore hole, The soil type may not be identifiable. There can be multiple items crossed in a single crossing.

In some embodiments, QC Segment is identified by the type of ground observed while ditching operations are being carried out. The QC section may be identified by GPS at start and finish.

Figure 6:
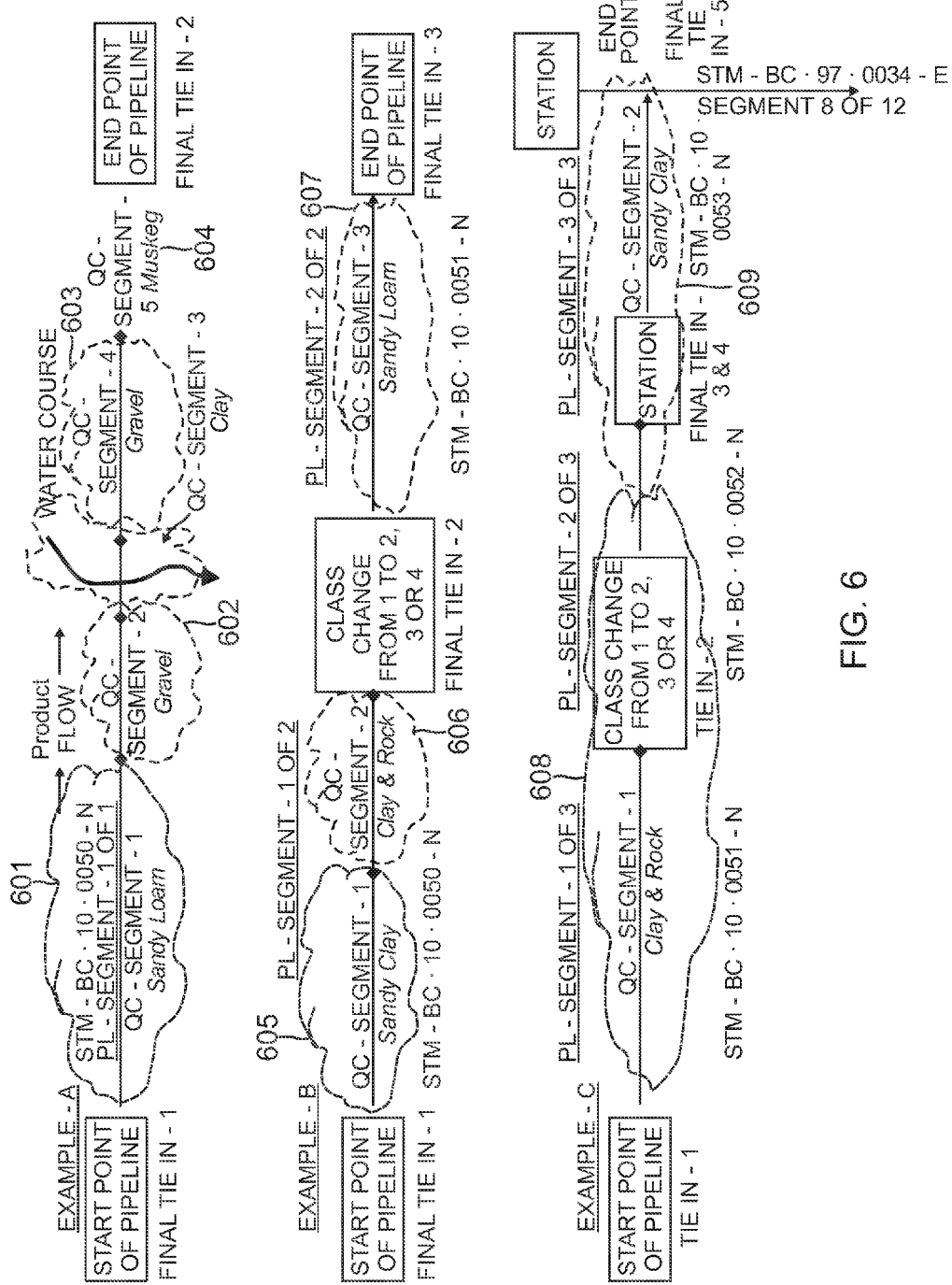
FIG. 6 is a representation of various types of QC_SEGMENTS that may be defined in a normal pipeline scenario, according to some embodiments of the present invention.

FIG. 6 is a representation of various types of QC_SEGMENTS that may be defined in a normal pipeline scenario, according to some embodiments of the present invention. Note that QC_SEGMENTS may be subset of normally defined (industry standard) pipeline segments. For example:

in a QC-SEGMENT 1, Ditch conditions are Sandy Loam,
in a QC-SEGMENT 2, Ditch conditions are Gravel,
in a QC-SEGMENT 3, Ditch conditions are Clay,
in a QC-SEGMENT 4, Ditch conditions are Muskeg,
in a QC-SEGMENT, Ditch conditions are Sandy Clay,
in a QC-SEGMENT 6, Ditch conditions are Clay and Rock,
in a QC-SEGMENT 7, Sandy Loam,
in a QC-SEGMENT 8, Ditch conditions are Clay and Rock, and
in a QC-SEGMENT 9, Ditch conditions are Sandy Clay.

In some embodiments, the QC_PROCESS includes an automated process, executed by one or more processors, for tying the INFRA to related DATA_SET data via TAGs. This process, called OPEN_TAG-CLOSE_TAG. OPEN_TAG-CLOSE_TAG, ties specific data associated with points and segments of the INFRA to proximately placed TAGs which are attached on or near QC_POINTS and QC_SEGMENT beginning and end points. TAGs from initial project provision through attachment to INFRA while simultaneously allowing for appropriate collection of DATA_SET information associated with each type of TAG. This method results in a new level of field validation and repair validation. The methods and rules and types of TAGs that are required by TAG_LIFE may provide a final validation of build, test, or repair.

For instance, when pipeline repairs are finished there is currently no process and method that leaves a TAG on or about the repair area that (a) proves or validates that there was work done on the INFRA and (b) can be queried by a public process that yields appropriate levels of information beyond that which is available on the TAG. Years later when a section of INFRA is uncovered (daylighted, in the case of a pipeline), the TAG left during the build, test or repair can be queried in the field and tied to DATA_SET data that was collected earlier during the active life cycle of managing the INFRA. TAG_LIFE also provides for a tagging standard (TAG_TYPE) that requires that TAGs of different color and design be placed in specific location (for example, upstream or downstream) of facilities features resulting in a standard method for interpreting visually or through electronic means, what the TAG represents. The unique combination of process (TAG_LIFE) and tagging standards (TAG_TYPE) provide a new environment for LAST_MILE validation of INFRA.

Figure 7:
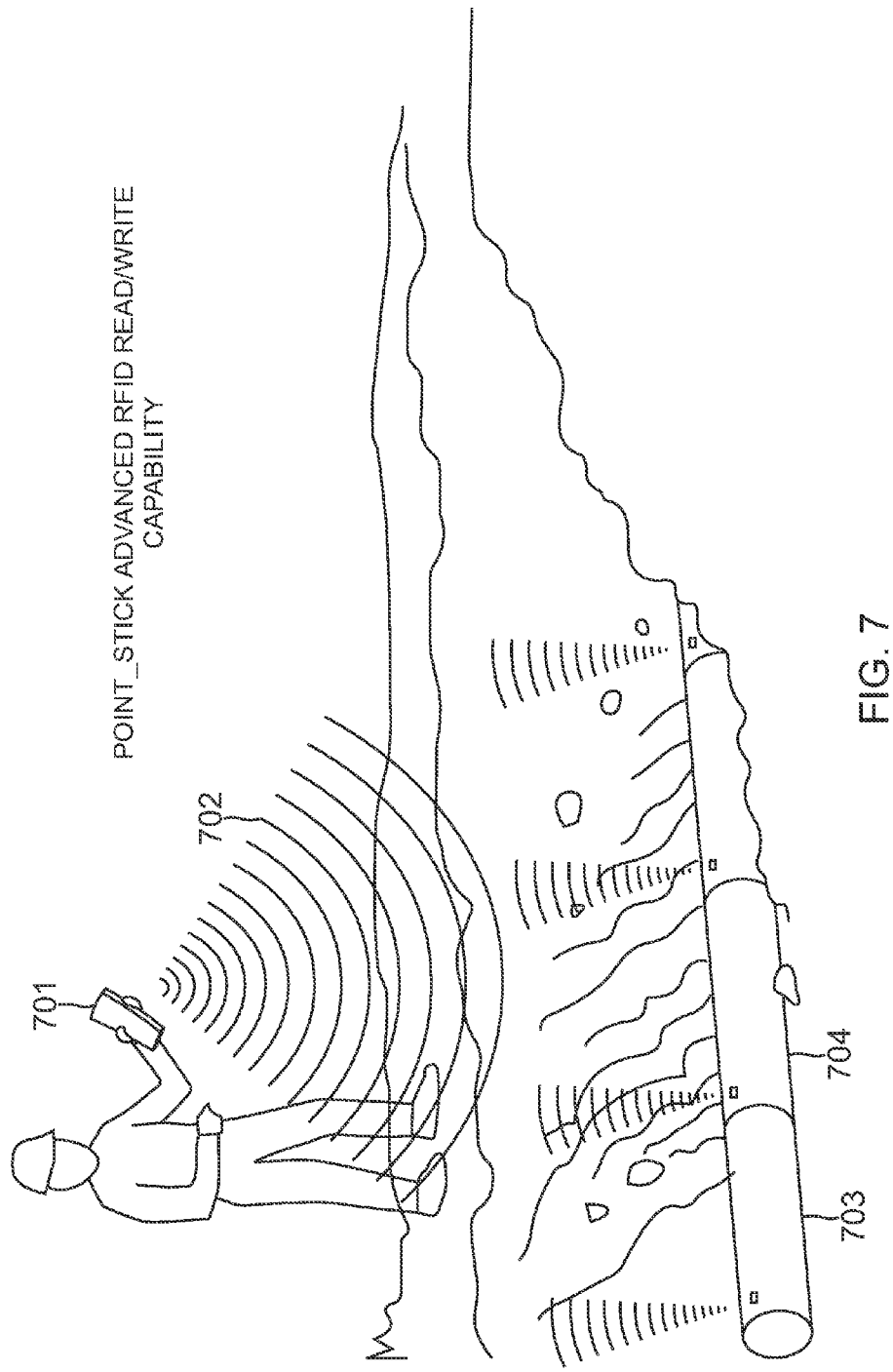
FIG. 7 shows a read/write process of locating RFID tags that have been placed on an INFRA, according to some embodiments of the present invention.

FIG. 7 shows a read/write process of locating RFID tags that have been placed on INFRA according to some embodiments of the present invention. The POINT_STICK RFID read/write capability represents an advance capability of RFID readers that not only read RFID signals in a traditional way, but also have the ability to discriminate and designate a particular tag from multiple tags that are exposed in the field. In some embodiments, this is done by a combination of RFID reader and laser technology.

A hand-held device 701 (including a processor, memory, I/O components, a display, and related software) can identify a particular tag, read its unique tag identifier and link the DAT_SET associated with that tag when pointed (702) at an exposed RFID TAG (which is one among many exposed TAGS is a ditch). This capability gives an inspector, who is observing a (uncovered or exposed) section of ditch the ability to stand at the edge of the ditch, to visually see a tag, to aim the POINT_STICK device at a selected TAG and to acquire data about the tag. The worker using the hand held POINT_STICK IFR or laser GPS device may point to a TAG position and read unique TAG Identifiers and link geo-reference position of tag with appropriate DATA_SET that was created when TAG was placed. For example, a particular type of TAG that has been placed 703 might be an INVENTORY TAG that is associated with a DATA_SET that has specifications of the pipe. Another particular type of TAG that has been placed 704 might be a JOIN TAG that is associated with a DATA_SET that has data about the join operation.

In some embodiments, an exemplary QCIA process results in multiple types of TAGs being placed for a pipe prior to its being loaded into the ditch including the following tags:

Join TAG—Join Tag—Tag is Red—placed at every join and corresponds to Join Work Data;
JOIN c/w Sleeve protecting weld plastic sleeve or epoxy coating covers the JOIN area;
PIPE JOINT—Line pipe;
PIPE SUPPORT—Supports are usually wooden, plastic cones, or air bags or sand bags;
INVENTORY TAG—Tag is Yellow;
INVENTORY TAG (in alternate Position)—All pipe, fittings, flanges & Pipeline units are tagged and include GPS data;
Top of excavated ditch;
Ditch Wall; and
Ditch Bottom.

In some embodiments, an exemplary process for placing a TAG includes:

All Tags are placed on the pipe prior to the pipe being buried.
The pipe is lowered into the ditch and a final jeeping test is performed looking for surface anomalies.
The worker walks the pipe as it is being lowered into the ditch and using the POINT_STICK device, geo-references each TAG by pointing at the TAG with a laser range finder capability, validating the TAG number and linking the geo-reference information to the TAG and thus the Data SET.
At the end of this process, all TAGS are placed on the pipe, the pipe is lowered into the ditch and all tags are geo-referenced into their actual position on the earth.
Later, when the pipe is uncovered for any reason, the same device can be used to point at a particular tag and bring up related data to it.

In some embodiments, the invention is further capable of providing (a) a design (BANG_STICK) for an optimized below ground reader and (b) a design for attaching a gas sensor to a buried RFID chip and (3) a design (POINT_STICK) for identifying and reading and writing to specific tags as they are lowered into the ground despite the fact that multiple tags are broadcasting simultaneously. For example, as a pipeline is being lowered into the ditch and is passing through its final 'jeeping' test, QC_PROCESS provides the capability to identify the TAG uniquely and to GPS its location via a combination of GPS and laser technology as it is being lowered into the ground. In some embodiments, the QC_PROCESS additionally provides for the ability to single out one TAG among many that have been Daylighted and to query that individual TAG from a distance.

Figure 8:
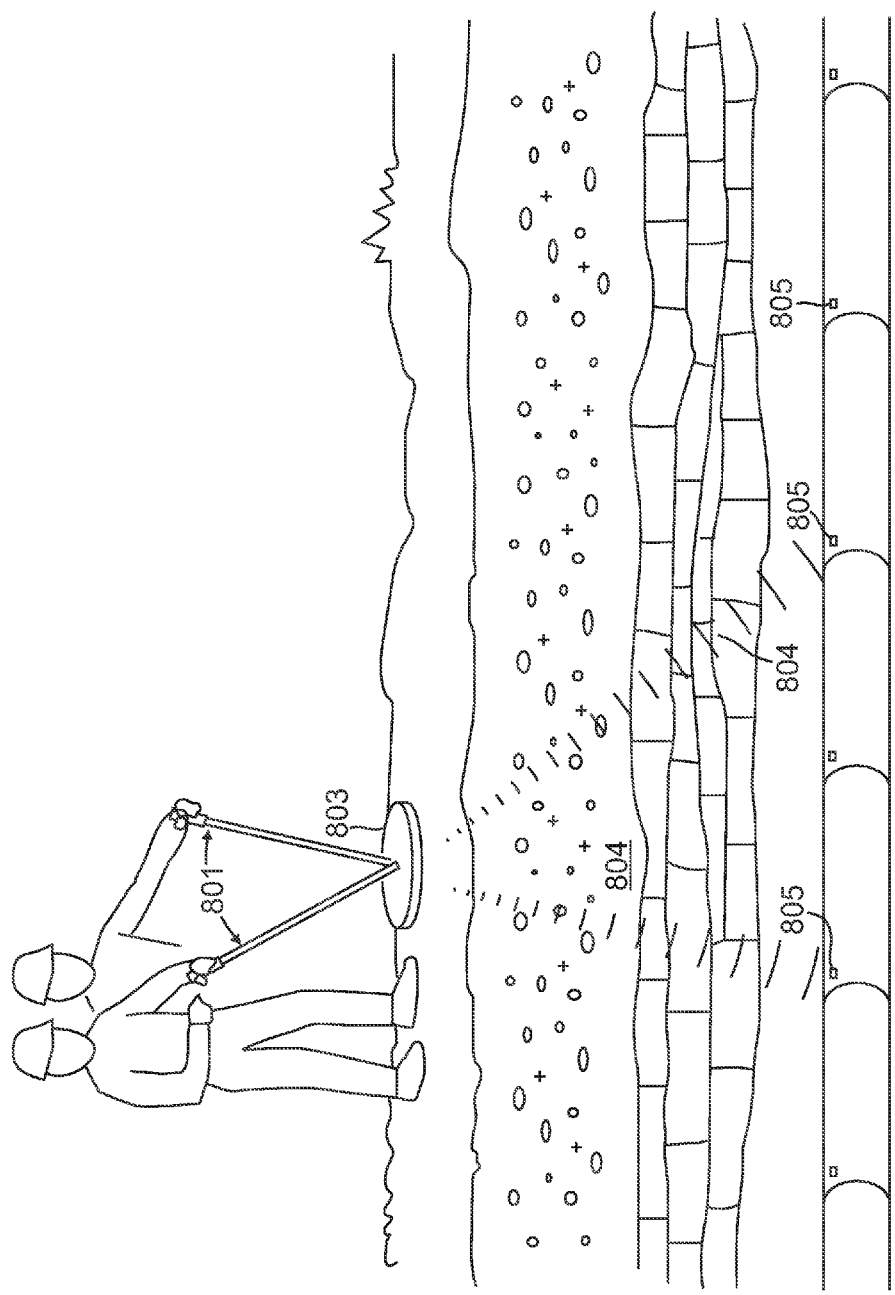
FIG. 8 is an exemplary process for reading RFID tags that are buried underground, according to some embodiments of the present invention.

FIG. 8 is an exemplary process for reading RFID tags that are buried underground according to some embodiments of the present invention. In some embodiments, below ground reads are accomplished by a 'bang stick' RFID reader (BANG_STICK). The BANG_STICK reader utilizes an enhanced signal that is aimed and focused into the ground only when the reader antennae are directed into the ground. The enhanced signal is approved based on the unique feature that the BANG_STICK can only be used for reading subsurface TAGs. TAGs of either passive or active design can be queried at depths below ground that allow them to be used on all commercial INFRA internationally.

TAGs that are read are linked back to publicly accessible sites to provide initial information on the INFRA on or about which the TAG is placed. A PUBLIC_READ software can be used on a wide variety of hand held devices such as mobile phones or tablets. PUBLIC_ACCESS provides virtually anyone the ability to read a TAG, which is Daylighted, using an electronic device such as a computer, PDA, mobile phone, and the like However, access to DATA_SET is strictly controlled beyond basic safety, ownership and identification that is provided to the general public.

Referring back to FIG. 8, a bang_stick 801 is held against the ground and rotated to search in a circular pattern for RFID signal. The bang_stick is GPS enabled allowing it to find location directly above RFID chip that has been previously geospatially located (X,Y,Z) during the TAG_LIFE process. Antennae 803 provide a powerful and focused beam of energy into the ground. The signal 804 is focused and can be modified in strength and coverage by the operator. TAGs 805 of special manufacture and design can last for many years below the ground and are optimized to be read at depths from the surface. A worker searching for a given RFID chip or chips finds the approximate location of buried TAGS using GPS coordinates from the QCIA system that were developed during the TAG_LIFE process when INFRA was tagged and the tags were geo-referenced.

As shown in FIG. 8, the operator placing an antenna array flat on the ground in a location indicated by previous GPS data. The worker sends a focused and strong signal into the ground, by the bang_stick 801, to search for the tag by sweeping the direction of the antennae 803 in a circular motion, thus allowing for a radius search for the tag in the candidate search area.

RFID chips 805 of both active and passive design, which have an extended life are capable of operating underground under the harshest of environmental conditions, emit a response that is specifically designed to be read and optimized by the advanced search capability previously described.

In some embodiments, the bang_stick reader 801 may be used to read output from the buried tag 805. The buried tag may have sensor attached to it for gas molecules leaks. The tag sensor (TAG_SENSOR) may be active or passive. In some embodiments, one or more bits of data is used to indicate a gas molecule leak. The active or passive sensor designed to sense presence of natural gas molecules.

In some embodiments, DATA_LIFE is a computer executed process that combines business rules and QC_STANDARDS for collecting data at key touch points to fully populate the data model of the DATA_SET. DATA_LIFE utilizes QC_ENGAGE, TAG_LIFE, WORK_UNIT, and audit functions and is the check and balance to field audit practices and derives audit and quality data assurance. For example, DATA_LIFE controls the list of data elements that must be populated for each WORK_UNIT and each TAG to pass any audit. The Audit program, using the business rules of DATA_LIFE, queries DATA_SET to verify that all data elements are populated in order to close out at WORK_UNIT or TAG.

TAG_LIFE is a computer implemented process for provisioning, commission, reading and linking TAGs to infrastructure and to collected data during the QCIA life cycle. The following is an exemplary process for TAG_LIFE.

Project is set up and all administrative data is input;

RFID TAGs are inventoried and unique project numbers assigned to tags. A list of the assigned Projects/Tags in stored in a table or database;

TAGs are commissioned onto jobs as needed;

OPEN_TAG is implemented when inspector/proxy is engaged with at WORK_UNIT task that will be tagged at the end of the task;

TAG is read by RFID reader which sets the TAG unique identifier as a key field for the data that will be collected around it;

TAG type is declared based on type of task being performed;

Data is collected;

Data collection is controlled and prompted by DATA_LIFE business rules;

TAG is installed and placed on QC_POINT or beginning or end of QC_SEGMENT based on TAG_LIFE rules;

Position of tag is geospatially referenced;

TAG is queried to test that all data is correct;

TAG is CLOSED indicating that the OPEN_TAG-CLOSE TAG process has been completed;

DATA_LIFE process links TAG data to QCIA system level reporting; and

AUDIT is run to verify close loop of DATA_LIFE.

Figure 9:
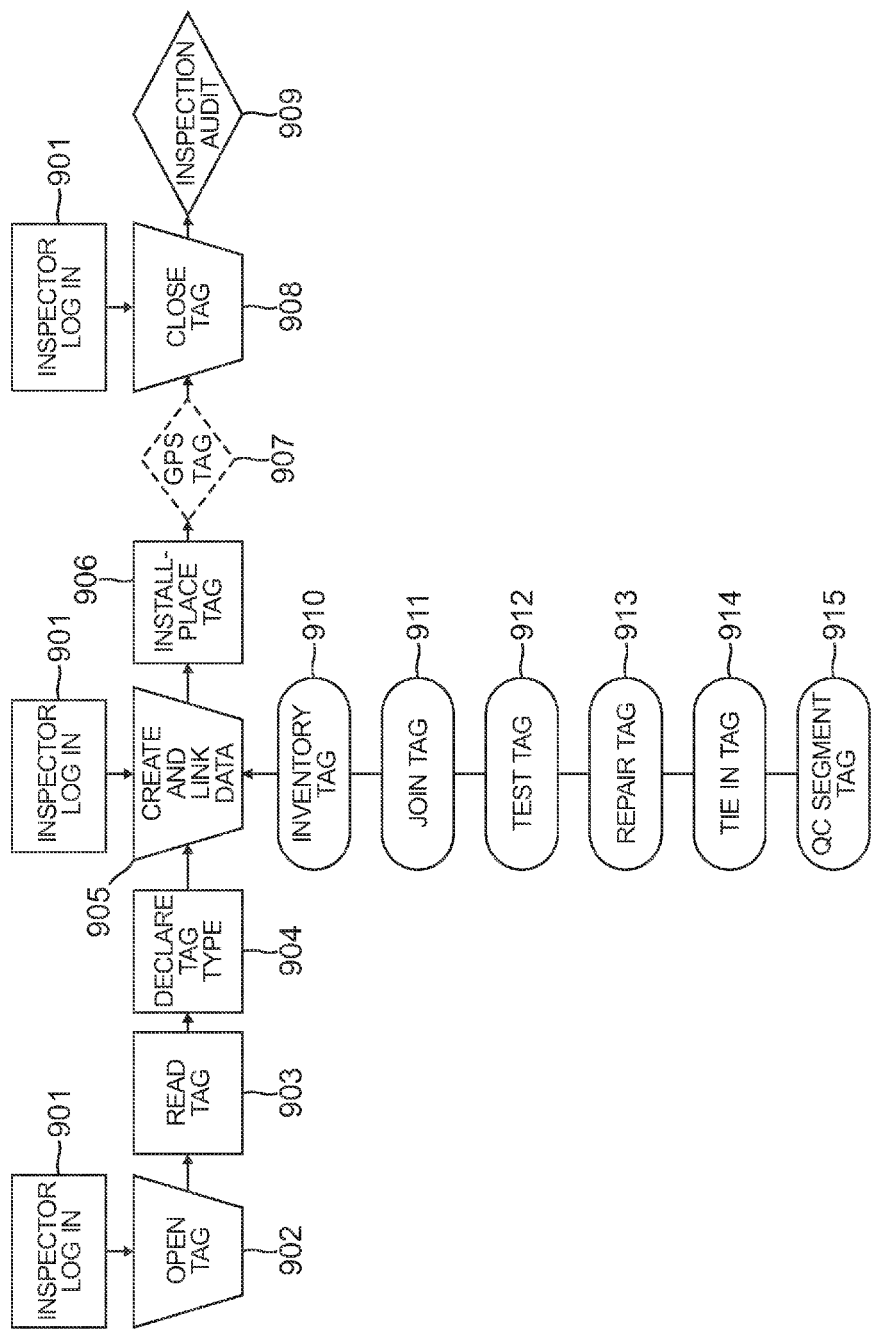
FIG. 9 depicts an exemplary process flow for opening tags and closing tags, according to some embodiments of the present invention.

FIG. 9 depicts an exemplary process flow for opening tags and closing tags (OPEN_TAG-CLOSE_TAG), according to some embodiments of the present invention. OPEN_TAG-CLOSE_TAG is a computer implemented process for opening and closing TAGs that controls the linkage between data collection, the proper type of tag, the tagging of INFRA and the geospatial locating on the tag.

In block 901, a user (e.g., an Inspector) logs into the system and identifies that he/she is prepared to collect data and to place RFID tags associated with work that is being done on a pipeline or other INFRA. In block 902, a TAG is opened to begin the process of tagging. OPEN TAG is a command in the QCIA system which provides a set of menus that controls the type of data that is to be collected for a particular task. The business rules that control the type of data and the type of tag to be used in the context of a particular task are pre-configured within the QCIA system of the present invention. The TAG is read in the field to validate the TAG_ID which uniquely identifies the TAG within the context of the INFRA project as well as the tie to data that will be collected, in block 903. The inspector or QCIA system user checks out a particular type of RFID tag from an inventory of TAGS.

For example, if the inspector is going to collect data associated with and intends to tag a JOIN, he/she would remove a JOIN tag. The JOIN tag has a particular shape or form factor required for attachment to the pipe, and is a particular color. Type of tag and color of tag are pre-determined and pre-configured by the QCIA system. The inspector then reads the unique RFID tag identifier from the tag using a field based RFID reader. The inspector then tells the QCIA system to attach all data that is collected and associated with the JOIN to the unique identifier of the tag. The QCIA system also 'checks out' the RFID tag from a master tag inventory, thus providing an accounting for all RFID tags that are used in the field.

In block 904, a TAG type is declared based on the need for a particular type of tag (DECLARE TAG TYPE). The inspector declares and validates that the TAG which has been removed from inventory is of a particular type or TAG TYPE. In the case of data being collected regarding a joint, the tag type is declared as a join tag. The declaration of the tag type is the program indicator to follow a set of business rules regarding the collection of data about the join as well as specifications regarding the placement of the tag on the pipe near the join.

In block 905, data is collected about the tasks within the WORK_UNIT and linked to TAG_ID data by the system (CREATE AND LINK DATA). Data is collected in the field as required based on the activities taking place in the field. The system provides guidance as to what data must be collected. Data collection is not a serial process, since work in the field is not a serial process. For example, data may be collected for a job that ends at 5 PM, and the rest of the data collected the next day or week. Data linked to the unique tag identifier by the system.

In block 906, TAG is placed or installed at the appropriate time during the work process. Placement is determined by QC_STANDARD for placement (INSTALL-PLACE TAG). At an appropriate time in the actual work flow in the field, the RFID tag is placed or installed on or near the QC_POINT or QC_SEGMENT begin or end as relevant to the data being collected for the particular task.

In block 907, TAG is geospatially referenced to show the position of the tag (GPS TAG). If the TAG represents a QC_POINT or the beginning or end of a QC_SEGMENT, it will be geo-referenced either in place, or once the pipe (with the tag on it) is placed in its final resting place in the ditch. GPS data of TAGs ties together the location of QC_REFERENCE POINTS with all data associated with the TAG. Inventory tags are not normally geo-referenced.

In block 908, TAG is closed when all data is collected as required by the TAG_LIFE and DATA_LIFE processes (CLOSE TAG). The inspector completes the data collection and tagging job associated with tasks or jobs in the field by closing the tag (CLOSE TAG). CLOSE TAG is a logical closing of the data collection and tagging process but does NOT necessarily indicate that all data required has been collected. Audit of the data collected, and validation of the tagging is a function of the internal QCIA audit process which, on command, can run a query to check to see that all required data (per business rules) and all tag installation rules (per business rules) have been followed. Under ideal conditions CLOSE TAG will pass audit.

In block 909, an audit program is executed to assess TAG data within context of WORK_UNIT data (INSPECTION AUDIT). Audit function is provided as a function of the QCIA program. At any time during the OPEN_TAG-CLOSE_TAG life cycle the audit program can be run to provide a listing of outstanding tasks or data that is missing from the particular OPEN_TAG-CLOSE_TAG life cycle. For example, if NDE inspection data has not been uploaded to the system and attached to field JOIN data, the audit program will flag this deficiency.

In block 910, an INVENTORY TAG may be created and placed. This type of TAG is primarily a material and inventory TAG. The system tracks all components and units that are utilized in building INFRA. Inventory tags are placed on components, units and other features of INFRA. Data associated with inventory tags is primarily concerned with specifications. For example, the heat number and manufacturer and size of a pipe would be associated with an inventory tag. inventory tags do not generally include GPS data. Specifications of materials used in components and units, other data associated with specification data, like procurement, vendor information etc., may be included with the INVENTORY TAG. Also, specific data about pipeline components like pipe, flanges, valves, weights, rock shield or sandbags may also be included with the INVENTORY TAG.

In block 911, a JOIN TAG may be created and placed. This TAG would be attached on or near a JOIN. DATA_SET generated by collection of all associated data may be linked to the JOIN. Other data associated with JOIN may include photographs, voice recordings, videos, non-engineering data like personal comments and observations, data on individuals who performed the welding operation, specific engineering data about the weld itself, type of weld etc., specific data about participating welder qualifications and welder field testing and qualification, and actual NDE XRAY or other NDE test results from JOIN/WELD inspection. Note that this data is not collected in the field, but is uploaded and linked into the system when it is provided by the test contractor.

In block 912, a TEST TAG may be created and placed. This TAG would be attached to validate TEST data. The TEST TAG indicates a TEST completed on the INFRA. TEST PEDIGREE DATA is a DATA_SET associated with TEST which includes appropriate TEST results as set forth by business rules associated with particular type of test. TEST META is another data set that is associated with TEST and includes photographs, voice recordings, videos associated with TEST may also include non-engineering data like personal comments and observations. TEST CONDITIONS is data associated with environmental and other ground or ambient conditions surrounding the TEST. TEST RESULTS are engineering data with TEST results as required by business rules. TESTERS is information regarding individuals or contractors performing the TEST. TEST PARAMETERS are parameters or engineering requirements that were applied during the TEST.

In block 913, a REPAIR TAG may be created and placed. This TAG would be attached on or near a REPAIR. REPAIR may include on or more of the following associated TAGs/data:
REPAIR PEDIGREE—DATA_SET associated with REPAIR which includes appropriate REPAIR data and results as set forth by business rules associated with particular type of test.
REPAIR DESCRIPTION—data associated with rationale and need for repair, and approach taken and justification.
REPAIR META is other data associated with REPAIR, includes photographs, voice recordings, videos associated with REPAIR may also include non-engineering data like personal comments and observations.
JOIN DATA is JOIN data associated if JOIN was required as part of REPAIR. Most REPAIR work requires some type of JOIN.
TEST RESULTS—engineering data with TEST results as required by business rules. Usually pressure tests associated with repairs utilizing JOINS.

In block 914, a TIE IN TAG that indicates a place where other sections of PIPE are tied in to the main pipeline may be created and placed. This TAG would be attached on or near a TIE-IN. The TIE IN TAG may include on or more of the following associated TAGs/data:

TIE IN PEDIGREE—DATA_SET of all appropriate data required to document and audit a pipeline TIE_IN.

COMPONENTS. Documentation of pipeline components that were used or involved in the TIE-IN JOIN DATA is JOIN data associated with JOIN that is required as part of TIE-IN. Most TIE-INS require some type of JOIN.

TIE IN META is other data associated with TIE-IN, includes photographs, voice recordings, videos associated with TIE-IN may also include non-engineering data like personal comments and observations.

TEST RESULTS—engineering data TEST results as required by business rules. Usually pressure tests associated with actions requiring JOINS.

In block 915, a QC_SEGMENT TAG may be created and placed. A TAG that shows the beginning and end point of a QC_SEGMENT. This type of tag would designate the beginning or end of a QC_SEGMENT and tie to data defining the segment. There may be various types of segments that qualify as a QC_SEGMENT. The QC SEGMENT TAG may include one or more of the following associated TAGs/data:

QC SEGMENT—DATA_SET that fully describes the QC_SEGMENT based on business rules that define data that is needed to describe each type of segment.

TEST SEGMENT DATA—DATA_SET that would be created if the QC_SEGMENT represents a segment of pipeline that was tested in a particular manner.

REPAIR SEGMENT DATA—DATA_SET that describes the area in which a repair of the pipeline was accomplished.

QC_SEGMENT DATA—DATA_SET that describes a section of ditch in which the environmental conditions are consistent, but which are different from other QC_SEGMENTS of the pipeline.

CROSSING SEGMENT DATA—DATA_SET that includes required data to describe and document CROSSING per business rules of the system.

Figure 10:
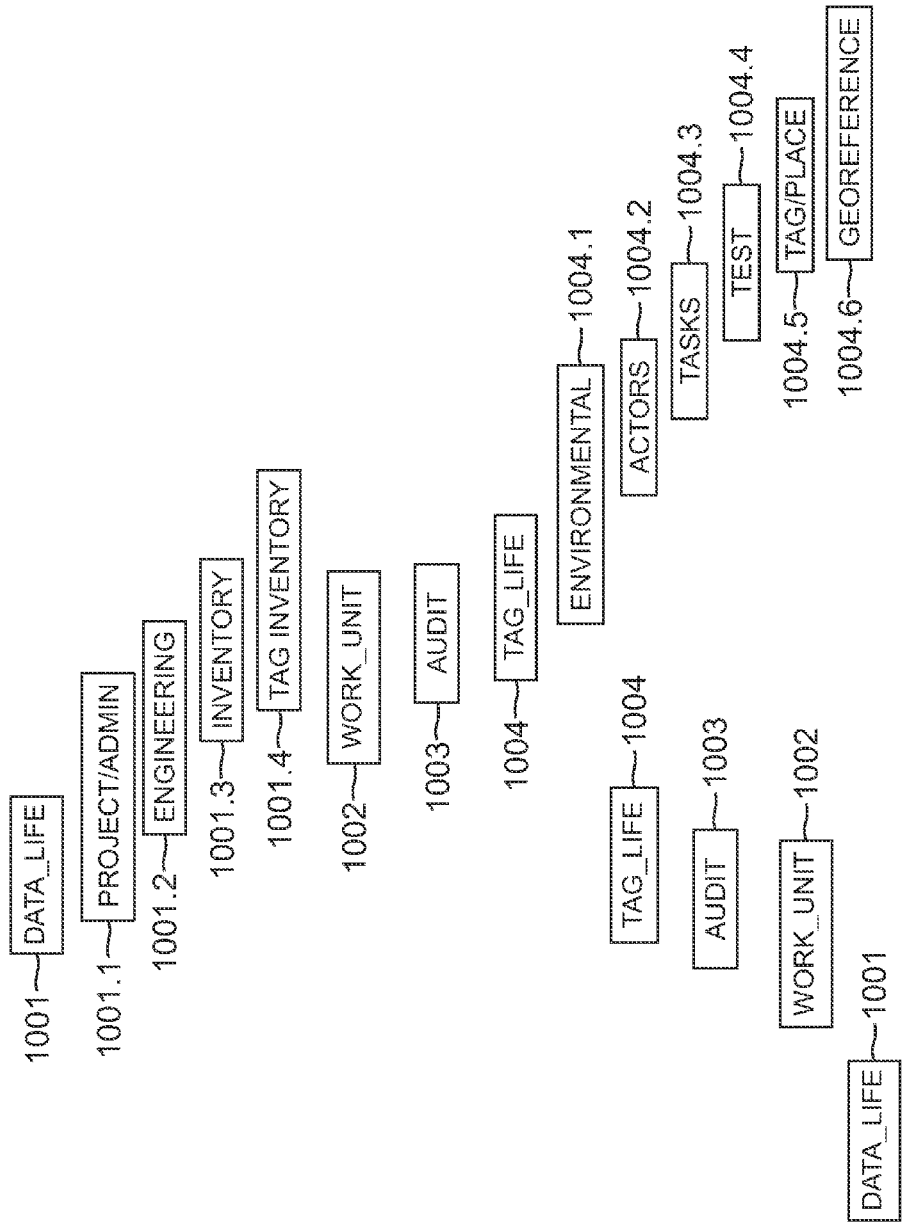
FIG. 10 shows an exemplary DATA_SET record, according to some embodiments of the present invention.

FIG. 10 shows an exemplary DATA_SET record, according to some embodiments of the present invention. A DATA_SET is defined as a data model that incorporates all data elements necessary to link data and infrastructure locations. The DATA_SET is uniquely created by a combination of its underlying data model combined with interactive methods of data collection provided by the invention under the guidance of the QC_PROCESS. The DATA_SET comprises of applicable data associated with new pipeline construction, the inspection of the build and the testing of the build. The invention also provides equivalent documentation of repairs to existing pipelines and other related structures. The DATASET is an information model that captures and organizes the full life cycle data that is required for the documentation, testing validation and build characteristics of the new pipeline construction phase within the oil and gas pipeline industry.

In some embodiments, the DATA_SET has the following systemic characteristics: (a) PODS, industry data standard compliant and normalized, and (b) designed for and maintained as Geospatial database. The DATA_SET includes joint creation pedigree and other data that can be used to identify, define, and assure compliance of pipeline configurations. Data is stored in a secure manner and is securely accessible.

Furthermore, a DATA_SET may:
a. Allow for creation, at the software application level, of a comprehensive build 'pedigree' for ALL key reference points or QC-RP in the life cycle of the pipeline build.
b. Provide INSPECT data that allows the application layer to create an inspect audit trail view of the data
c. Provide for test data that can be compared to engineering specs and other standards and also supports and audit of test performance on the build.
d. Be linked relationally, linked to geospatial coordinates and to RF-UID unique identifiers and to RFID asset management inventory control identifiers (RFID-DB).
e. Be uniquely complete, organized and normalized, and provides the application layer of the system with the capability to generate views of data including build, inspect, test views.

Referring back to FIG. 10, block 1001 represents the business rules provided by the DATA_LIFE standard which controls the collection and validation of data within the QCIA system as the system facilitates the QC_PROCESS. DATA_LIFE is a comprehensive set of business rules that controls and manages the types of data that are required to be collected and validated during each phase of the QC_PROCESS. In addition to business rules, DATA_LIFE inherently provides rules for data types, field sizes and all other characteristics that are required by standard database architecture. DATA_LIFE is a configurable set of rules that provides the QCIA program with the flexibility of supporting various types of data collection projects that may have different data requirements. It serves as a control function for all data collection within the system.

Block 1001.1 represents all PROJECT/ADMIN data that is collected, primarily by the ADMIN module. This data is administrative in nature and refers to project codes and ownership. All of this data is available for reference for to extend data that is being collected in the field from operational modules. This data is normally collected or imported prior to the start of projects.

Block 1001.2 represents all engineering data, formulas and specifications that is used by the program to perform required calculations during the operational phases of the program. This data is normally provided by the project engineer and serves as a basis for all engineering calculations.

Block 1001.3 represents a traditional inventory functionality for components and units. All components and units will be checked into inventory and then checked out as they are provisioned into the field. Data about the specifications of components and units is entered into the inventory system as is used and linked to INVENTORY TAGS that are placed during the TAG_LIFE process support of the completion of a WORK_UNIT.

Block 1001.3 represents an inventory of RFID TAGS which will be provided by various TAG manufacturers. RFID tags are checked out of inventory and are provisioned into the field for use by the QCIA program as needed. This process provides a check and balance to make sure that all TAGS used in the field are accounted for by the tag inventory system.

Block 1002 represents the concept that the WORK_UNIT is a logical 'wrapper' for all data which is collected and all RFID tags that are placed associated with logical groupings of work. For example, an individual or group of pipeline repairs could be considered a WORK_UNIT or logical grouping of tasks.

Block 1003 represents the AUDIT function that is applicable to all data and tags that are associated with a WORK_UNIT of tasks. The AUDIT function provides users of the QCIA system with the ability to query or AUDIT the status of data collection and tagging. The AUDIT function answers the question "Has all data been collected and have all tags been properly placed and geo-referenced in compliance with the business rules set forth by the DATA_LIFE process?

Block 1004 TAG_LIFE represents the specific set of business rules associated with linking data that is collected with RFID tags in the field. TAG_LIFE controls the interface between data collected and the installation of TAGS in the field, thus ensuring that TAGS that are placed on INFRA are tied to data that has been collected. For example, a JOIN will be tagged with a JOIN tag. TAG_LIFE provides the process, business rules, standards, and specifications necessary to ensure that a proper tag type is placed in a proper position on the pipe and that data associated with the tag (JOIN data) is linked to the TAG. When the TAG is read, the QCIA program has the ability to recall add data associated with that TAG. In addition TAB_LIFE ensures that the TAG is properly geo-referenced. The AUDIT function looks at data and flags that have been set under the control of TAG_LIFE and DATA_LIFE to verify that all data is in order to pass AUDIT.

Blocks 1004.1 to 1004.6 represents examples of discrete data that is collected during a QCIA project. This grouping is representative and not complete.

Block 1004.1 ENVIRONMENTAL—data associated with environmental conditions in and around the pipeline or INFRA at the time work is done. For example, ambient air temperature at the time a weld (JOIN) is being done.

Block 1004.2 ACTORS—Information about employees or contractors and relevant individuals that are doing work on INFRA. Would include qualifications and field testing data that is relevant to work being done.

Block 1004.3 TASKS—Data about the how and what and when of field activities. For example the DATA_SET that is generated when all data that is required to document a JOIN is collected.

Block 1004.4 TEST and/or INSPECTION—Test or inspection results. This could be pressure tests results or NDE XRAY results.

Block 1004.5 TAG/PLACE—Data associated with placement of a TAG near work or a segment that is to be designated. For example, this includes the unique TAG identifier, possibly another TAG inventory identifier, and data about form factor, actual placement, and color.

Block 1004.6 GEOREFERENCE—Data from geo-reference of TAG. This includes GPS strings generated as tag is geo-referenced.

Figure 11:
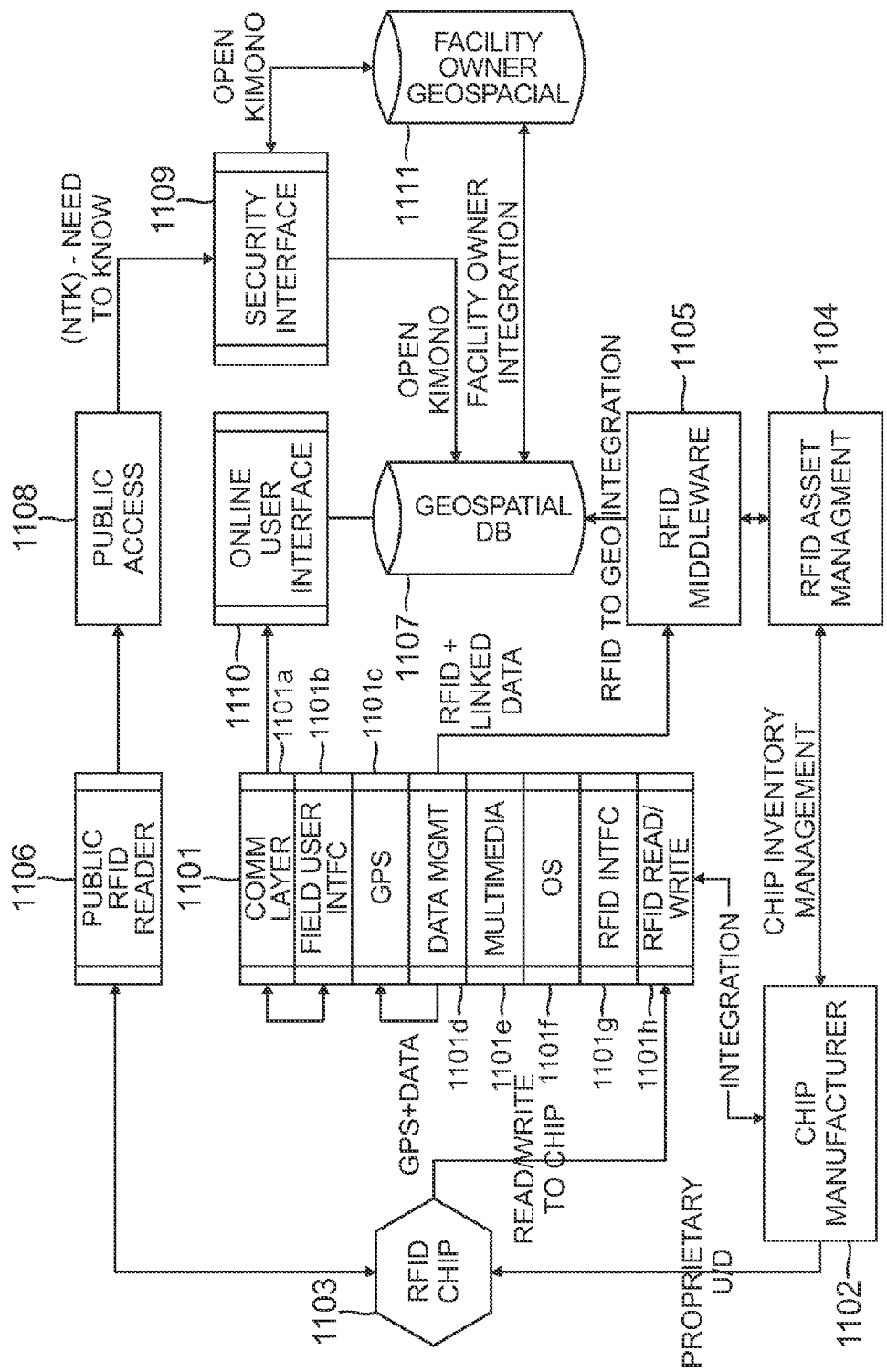
FIG. 11 depicts an exemplary system level architecture, according to some embodiments of the present invention.

FIG. 11 depicts an exemplary system level architecture, according to some embodiments of the present invention. The architecture (QC_ARCHITECTURE) is unique in its combination of multi-functional field data collection software and hardware, RFID hardware and software and Geospatial databases. Field data collection software and hardware stack provide data collection, RFID read/write, RFID management middleware, GPS, and multi-media, in a single integrated field ruggedized and explosion proof configuration.

Block 1101 represents the software stack (levels of functionality that would reside on a multi-functional field hardware device) that would be used in the field for data collection, tagging and geo-referencing of tags.

Block 1101.*a*—COMM LAYER—software layer (like WIFI or 3/4G), executed on one or more processors, allows the device to connect to the server or CLOUD.

Block 1101.*b* FIELD USER INTFC—QCIA program, executed on one or more processors, which controls the data collection and audit functions in the field. The primary user interface and main USER program.

Block 1101.*c*—GPS—GPS capability that allows for geo-referencing of TAGS in the field.

Block 1101.*d*—DATA MANAGEMENT—Data management layer, executed on one or more processors, controls data being collected from various inputs like GPS, QCIA program data inputs and RFID reads. This layer integrates data from all inputs into a DATA_SET that is then linked with Geospatial Database.

Block 1101.*e*—MULTIMEDIA software—Photo, voice and video capabilities that can link multi-media objects to the QCIA database via the DATA MANAGEMENT layer. Primarily used for the development of META data associated with tasks.

Block 1101.*f*—OS—Operating system layer of the field device—Like MS Windows Mobile.

Block 1101.*g*—RFID INTFC—RFID read write interface layer to the DATA MANAGEMENT LAYER—this is a software abstraction layer, executed on one or more processors, which will allow a wide variety of RFID readers to interface with and share data with the QCIA program via the DATA MANAGEMENT layer.

Block 1101.8—RFID READ/WRITE—RFID read write device/antennae and firmware that is either integrated into the field device or is connected to the device.

Block 1102—CHIP MANUFACTURE—OEM (Original equipment manufacturer) of RFID chips. Chips can be active or passive in design. QCIA system will be flexible in its ability to use a wide variety of custom or generic chips. The CHIP MANUFACTURE will provide an inventory of chips (Block 3) and also provide an on-line (Block 4) RFID ASSET MANAGEMENT tracking capability that provides tracking of chips provided to QCIA system user or system provider.

Block 1103—RFID CHIP— RFID chips is provided and serves the purpose of tagging within the QCIA system. In most cases, the chips reside on custom designed form factors and be created in different colors to be used as part of the TAG_LIFE process. For instance, a JOIN TAG would be form fitted to installation on a pipe and might be colored red.

Block 1104—RFID ASSET MANAGEMENT—Asset management software, executed on one or more processors, provided by the RFID chip manufacturer to keep track of chip inventory. As a chip is provisioned into the field for tagging, it is 'checked out' of the asset management inventory. This serves as a double check and validation that chips checked out of inventory are, in fact, installed in the field.

Block 1105—RFID MIDDLEWARE—Actively controls the RFID field management environment which is integrated back to the system via the RFID middleware provided by the chip manufacturer that provides extended functionality including field read/write management and other advanced capabilities. RFID middleware directly supports field read write functionality and is optimized for the type of reader/antennae in use and with the types of chips being used in the field. Block 1105 is also integrated with block 4 RFID Block 1104 Asset Management layer on the field device.

Block 1106—PUBLIC RFID READER—OPEN SOURCE or publically available/commercially used RFID readers. QCIA system provides that the general public will have the ability to read applicable QCIA system RFID tags.

The public reader will direct the public to the block 1108 Public Access landing page, where they will find a level of information concerning the TAG that will provide contact and public safety oriented information. For example, if a person on a walk smells leaking gas, they can use their mobile phone and a generic RFID reader to access the pipeline data belonging to XYZ corp and they will be given an emergency number to call.

Block 1107—GEOSPATIAL DB—The core system of QCIA is a sophisticated geo-spatial database and application environment that manages the QCIA application program layers as well as maintaining a sophisticated geo-spatial enabled database of all QCIA data. An example of this type of environment is ESRI.

Block 1108—PUBLIC ACCESS—Public access landing page target for all publically read RFID tags. An individual scans a tag with public or generically available RFID reader software and are automatically taken to the PUBIC ACCESS LANDING page.

Block 1109—SECURITY INTERFACE—The security interface either stops further inquiry or allows deeper penetration into the system based on password and other identification security measures. The SECURITY INTERFACE is directly accessible to those with the proper URL and also serves as a back-end to Block 1108 PUBLIC ACCESS. The security access allows users to access the heart of the QCIA system which resides and is served up from Block 7 the GEOSPATIAL DB.

Block 1110—ONLINE USER INTERFACE—This is the interface between field and office devices and the primary computing facilities and database that reside on block 1107. When a field inspector is collecting data and transferring it to the CLOUD it is through the ONLINE USER INTERFACE. Security for this interface is high and requires validation that the device that is connected is a safe device and that proper credentials have been presented.

Block 1111—FACILITY OWNER GEOSPACIAL—Most facility owners maintain geospatial databases of their facilities at various levels of sophistication. The system also has the ability to maintain a complete geospatial database or to provide a data set extension to the facility owner database. For example, if the facility owner maintains their own sophisticated database and do not want to share it, the system of the present invention has the ability to provide an extension data set that overlays and enhances the facility owner database with the data that has been developed during the QC_PROCESS. This provides a complete value add to the facility owner without the need for them to release any of their data outside of their security areas.

Figure 12:
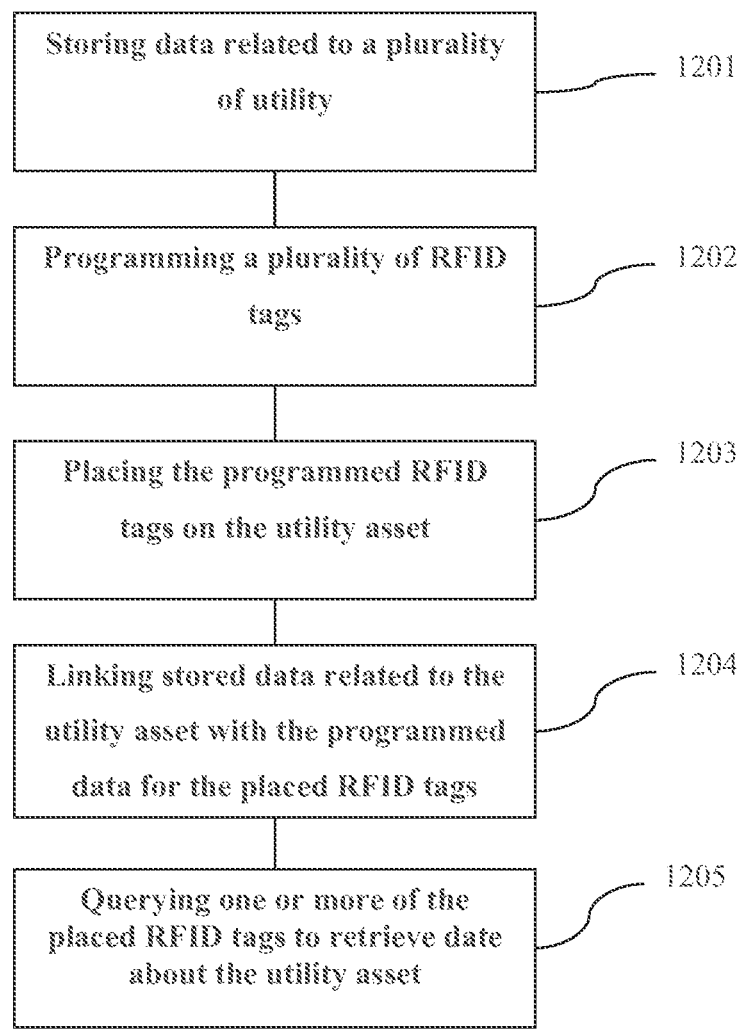
FIG. 12 is an exemplary process flow executed by one or more processors, according to some embodiments of the present invention.

FIG. 12 is an exemplary process flow executed by one or more processors, according to some embodiments of the present invention. The executed method performs capturing, organizing and retrieving data for utility assets using RFID tags, among others. As shown in block 1201, data related to a plurality of utility assets in stored in a database, accessible by a plurality of processors. The stored data may include data about type of the utility asset; repair, documentation, testing validation, and inspection of the utility asset. In block 1202, a plurality of RFID tags are programmed for placement on a utility asset. The programming process may include retrieving a unique RFID tag identifier from the RFID tag using an RFID reader device, linking data associated with the utility asset to the unique RFID tag identifier, and checking out the programmed RFID tag from an RFID inventory database. This enables an accounting for all RFID tags that are used in the field.

In block 1203, the programmed RFID tags are placed on the utility asset. In some embodiments, at least one of the programmed RFID tags is placed on a specific segment of the utility asset as a segment tag, and at least one of the programmed RFID tags is placed near a specific joint of the utility asset as a join tag. In block 1204, the stored data related to the utility asset (in the database) is linked with the programmed data for the placed RFID tags. The linked data includes location data of the placed RFID tags.

In block 1205, one or more of the placed RFID tags are queried to retrieve data about the utility asset including data about the location of the utility asset, the type of the utility asset; repair, documentation, testing validation, and inspection of the utility asset.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for capturing, organizing and retrieving data for utility assets using RFID tags, the method comprising:

storing data related to a plurality of utility assets in a database, wherein the stored data includes data about type of the utility assets, repair, documentation, testing validation, and inspection of the utility assets;

programming a plurality of RFID tags for placement on a utility asset by loading programming data into the plurality of RFID tags, by one or more processors;

placing the programmed RFID tags on the utility asset, wherein at least one of the programmed RFID tags is placed on a specific segment of the utility asset as a segment tag, and at least one of the programmed RFID tags is placed near a specific joint of the utility asset as a join tag;

linking stored data related to the utility asset with the programmed data for the placed RFID tags, including location data of the placed RFID tags; and querying one or more of the placed RFID tags to retrieve data about the utility asset including data about the location of the utility asset, the specific segment and the specific joint, the type of the utility asset; repair, documentation, testing validation, and inspection of the utility asset, by one or more processors, wherein said segment tag includes stored data describing environmental conditions including soil conditions of a location where the specific segment was installed, an X-ray of an operation performed on a join of the specific segment, and data describing the environmental conditions including ambient temperature at a time when a repair was performed on the specific segment, and wherein querying one or more of the placed RFID tags to retrieve data further comprises executing an audit program to validate the data or compliance of the data to certain standards.

2. The method of claim 1, further comprising generating a report about the utility asset, according to a plurality of stored rules.

3. The method of claim 1, wherein said stored data related to the plurality of utility assets includes one or more of data collection dates and methods, photographs, voice, videos, and location points, related to the utility asset.

4. The method of claim 1, wherein said programming RFID tags include retrieving a unique RFID tag identifier from the RFID tag using an RFID reader device; linking data associated with the utility asset to the unique RFID tag identifier; and checking out the programmed RFID tag from an RFID inventory database.

5. The method of claim 1, wherein said join tag includes data about the specific joint of the utility asset including data about the person who performed any repair or operation on the specific joint, the date of the repair or operation and the type of the repair or operation.

6. The method of claim 1, wherein said segment tag includes one or more of the following: associated data describing the specific segment; data related to testing or validation of the specific segment; and data describing the area in which a repair of the segment was performed, according to a plurality of stored business rules.

7. The method of claim 1, wherein said segment tag further includes stored data describing a location of any crossing of other utility assets with the specific segment data including data about one or more of restricted areas, roads, and rivers.

8. The method of claim 1, further comprising programming a repair RFID tag and placing the programmed repair RFID tag on or about a repair area on the utility asset to describe and validate a repair work performed on the repair area.

9. The method of claim 1, wherein said audit program validates that all required data and all tag installation rules have been followed, according to a plurality of stored business rules.

10. The method of claim 1, further comprising pointing an RFID reader device to the utility asset including the placed RFID tags; distinguishing and identifying a particular placed RFID tag from the placed RFID tags by the reader device; and retrieving data from the identified RFID tag by the reader device.

11. The method of claim 10, further comprising generating a plurality of revised data records for the utility asset based on the retrieved data, the stored data and data from a data source, related to the utility asset; and storing the revised data records for the utility asset in the database.

12. The method of claim 1, wherein the placed RFID tags include a sensor to sense any gas molecule leaks from the utility asset.

13. The method of claim 1, wherein said utility asset is a pipeline and wherein said segment tag further includes data describing environmental conditions of a ditch where the specific segment of the pipeline was buried, and data describing a start point and a stop point of a pressure test performed on the specific segment.

14. A computer implemented method for capturing, organizing and retrieving data for utility assets using RFID tags, the method comprising:
  storing data related to a plurality of utility assets in a database, wherein the stored data includes data about type of the utility assets; repair, documentation, testing validation, and inspection of the utility assets;
  programming a plurality of RFID tags for placement on a utility asset, by one or more processors, wherein said programming comprises:
    retrieving a unique RFID tag identifier from a programmed RFID tag using an RFID reader device,
    linking data associated with the utility asset to the unique RFID tag identifier, and
    checking out the programmed RFID tag from an RFID inventory database by one or more processors;
  placing the programmed RFID tag on the utility asset;
  linking stored data related to the utility asset with the programmed data for the placed RFID tag, including location data of the placed RFID tag; and
  querying the placed RFID tag to retrieve data about the utility asset including data about the location of the utility asset, the type of the utility asset, repair, documentation, testing validation, and inspection of the utility asset, by one or more processors, wherein said data associated with the utility asset includes stored data describing environmental conditions including soil conditions of a location where the specific segment was installed, and data describing the environmental conditions including ambient temperature at a time when a repair was performed on the specific segment, and wherein querying one or more of the placed RFID tags to retrieve data further comprises executing an audit program to validate the data or compliance of the data to certain standards.

15. The method of claim 14, wherein at least one of the programmed RFID tags is placed on a specific segment of the utility asset as a segment tag, and at least one of the programmed RFID tags is placed near a specific joint of the utility asset as a join tag.

16. The method of claim 14, further comprising generating a report about the utility asset, according to a plurality of stored rules.

17. The method of claim 14, wherein said stored data related to the plurality of utility assets includes one or more of data collection dates and methods, photographs, voice, videos, and location points, related to the utility asset.

18. The method of claim 14, further comprising programming a repair RFID tag and placing the programmed repair RFID tag on or about a repair area on the utility asset to describe and validate a repair work performed on the repair area.

19. The method of claim 14, wherein said audit program validates that all required data and all tag installation rules have been followed, according to a plurality of stored business rules.

20. The method of claim 14, further comprising generating a plurality of revised data records for the utility asset based on the stored data and data from a data source, related to the utility asset; and storing the revised data records for the utility asset in the database.

* * * * *